(12) United States Patent
Yoshida et al.

(10) Patent No.: US 10,163,370 B2
(45) Date of Patent: Dec. 25, 2018

(54) DECODING APPARATUS, DECODING CAPABILITY PROVIDING APPARATUS, METHOD THEREOF AND PROGRAM

(71) Applicant: NIPPON TELEGRAPH AND TELEPHONE CORPORATION, Tokyo (JP)

(72) Inventors: Reo Yoshida, Musashino (JP); Go Yamamoto, Musashino (JP); Tetsutaro Kobayashi, Masashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 218 days.

(21) Appl. No.: 14/900,517

(22) PCT Filed: Jun. 30, 2014

(86) PCT No.: PCT/JP2014/067352
§ 371 (c)(1),
(2) Date: Dec. 21, 2015

(87) PCT Pub. No.: WO2015/008607
PCT Pub. Date: Jan. 22, 2015

(65) Prior Publication Data
US 2016/0133164 A1 May 12, 2016

(30) Foreign Application Priority Data
Jul. 18, 2013 (JP) .................................. 2013-149156

(51) Int. Cl.
H04L 29/06 (2006.01)
G09C 1/00 (2006.01)
(Continued)

(52) U.S. Cl.
CPC ................ *G09C 1/00* (2013.01); *H04L 9/008* (2013.01); *H04L 9/0819* (2013.01); *H04L 2209/60* (2013.01); *H04L 2209/76* (2013.01)

(58) Field of Classification Search
CPC ... G06F 21/602; H04L 2209/76; H04L 9/008; H04L 9/3073
See application file for complete search history.

(56) References Cited

U.S. PATENT DOCUMENTS

2005/0066174 A1 3/2005 Perlman
2012/0323981 A1 12/2012 Yamamoto et al.
(Continued)

FOREIGN PATENT DOCUMENTS

JP 2012-212031 A 11/2012
WO WO 2011/086992 A1 7/2011
(Continued)

OTHER PUBLICATIONS

Yuto Kawahara et al., English translation of "Implementation of Decryption with Self-corrector in Pairing-based Crytosystems", 2011, Applicant's submitted NPL in IDS filed on Dec. 21, 2015.*
(Continued)

*Primary Examiner* — Chau Le
(74) *Attorney, Agent, or Firm* — Oblon, McClelland, Maier & Neustadt, L.L.P.

(57) ABSTRACT

A decoding apparatus performs self-correcting processing with a decoding capability providing apparatus holding a decoding key for decoding first ciphertext which can be decoded by homomorphic operation to obtain a decoding value of the first ciphertext, and performs non-homomorphic operation using a value corresponding to or deriving from the decoding value of the first ciphertext and an addition value to output plaintext.

11 Claims, 10 Drawing Sheets

(51) Int. Cl.
*H04L 9/00* (2006.01)
*H04L 9/08* (2006.01)

(56) References Cited

U.S. PATENT DOCUMENTS

| | | | |
|---|---|---|---|
| 2013/0318360 A1* | 11/2013 | Yamamoto | G06F 21/602 |
| | | | 713/189 |
| 2013/0339413 A1 | 12/2013 | Yamamoto et al. | |
| 2014/0037089 A1* | 2/2014 | Itoh | H04L 9/0869 |
| | | | 380/46 |
| 2015/0172258 A1* | 6/2015 | Komano | H04L 9/0816 |
| | | | 380/259 |
| 2017/0366349 A1* | 12/2017 | Lyubashevsky | H04L 9/3221 |
| 2018/0183570 A1* | 6/2018 | Zheng | H04L 9/00 |

FOREIGN PATENT DOCUMENTS

| | | |
|---|---|---|
| WO | WO 2012/057134 A1 | 5/2012 |
| WO | WO 2012/121152 A1 | 9/2012 |

OTHER PUBLICATIONS

Jose Luis Gomez Pardo, Screenshot of page 609 of "Introduction to Cryptography with Maple", 2012, http://books.google.com.*

Dan Boneh and Matthew Franklin, Identity-Based Encryption from the Weil Pairing, 2003, Appears in SIAM J. of Computing, vol. 32, No. 3, pp. 586-615.*

Extended European Search Report dated Feb. 20, 2017 in Patent Application No. 14826053.2.

David Galindo, et al., "The Security of PSEC-KEM Versus ECIES-KEM" XP055344300, Apr. 21, 2005, 11 Pages.

Victor Shoup, et al., "Information technology—Security techniques—Encryption algorithms—Part 2: Asymmetric ciphers" International Standard, First Edition ISO/IEC 18033-2, XP009190859, May 1, 2006, 132 Pages (Reference previously filed as "Information technology—Security techniques—Encryption algorithms—Part 2: Asymmetric ciphers", International Standard, ISO/IEC 18033-2:2005E 134 Pages, (2005)).

International Search Report dated Sep. 9, 2014, in PCT/JP2014/067352 filed Jun. 30, 2014.

Yuto Kawahara et al., "Implementation of Decryption with Self-corrector in Paring-based Cryptosystems", SCIS 2011, 10 Pages, (2011) (with partial translation).

PSEC-KEM specifications, NTT Information Sharing Platform Laboratories, NTT Corporation, 23 Pages, (2008).

"Information technology—Security techniques—Encryption algorithms—Part 2: Asymmetric ciphers", International Standard, ISO/IEC 18033-2:2005E 134 Pages, (2005).

Dan Boneh et al, "Identity-Based Encryption from the Weil Pairing," Appears in SIAM J. of Computing, vol. 32, No. 3, pp. 586-615, (2003). An extended abstract of this paper appears in the Proceedings of Crypto 2001, vol. 2139 of Lecture Notes in Computer Science, pp. 213-229, Springer-Verlag, (2001).

Dan Boneh et al., "Improved Efficiency for CCA-Secure Cryptosystems Built Using Identity-Based Encryption", In Proceedings of RSA-CT '05, LNCS 3376, pp. 87-103, (2005).

"RSAES-OAEP Encryption Scheme: Algorithm specification and supporting documentation", R RSA Laboratories, SA Security Inc, 38 Pages, (2000).

Office Action dated Jul. 19, 2016 in Japanese Patent Application No. 2015-527239 (with English language translation).

Office Action dated Jun. 15, 2018 in European Patent Application No. 14826053.2, 8 pages.

European Office Action dated Nov. 21, 2017 in Patent Application No. 14 826 053.2.

* cited by examiner

DECODING APPARATUS, DECODING CAPABILITY PROVIDING APPARATUS, METHOD THEREOF AND PROGRAM

TECHNICAL FIELD

The present invention relates to a decoding technique using a cloud-managed key.

BACKGROUND ART

A specific decoding key is required to decode ciphertext encrypted using an encryption method such as public key cryptography and common key cryptography. In order for a decoding apparatus which does not have a decoding key to obtain a decoding result of the ciphertext, there is one method among conventional methods, in which an external apparatus holding a decoding key provides the decoding key to the decoding apparatus and the decoding apparatus decodes the ciphertext using the decoding key. There is another conventional method for the decoding apparatus to obtain a decoding result of the ciphertext, in which the decoding apparatus provides the ciphertext to an external apparatus and the external apparatus decodes the ciphertext and provides the decoding result to the decoding apparatus.

However, the former method involves a problem in safety because the decoding key itself is provided to the decoding apparatus. Meanwhile, with the latter method, the decoding apparatus cannot verify the correctness of the decoding result.

As a technique for solving these problems, there is a decoding technique using a cloud-managed key according to a self-correcting technique (see, for example, Patent literatures 1 to 3, or the like). The self-correcting technique is a technique of always performing correct calculation using a calculator or a system which does not always output a correct calculation result (technique of outputting a correct calculation result when a calculator which outputs a correct calculation result is used, and obtaining a correct calculation result or obtaining a result indicating that it is impossible to perform calculation when a calculator which does not always output a correct result). In the decoding technique using the cloud-managed key according to the self-correcting technique, a decoding capability providing apparatus which holds a decoding key provides only information for decoding ciphertext without providing a decoding key to the decoding apparatus. The decoding apparatus can always perform correct decoding calculation using this information.

PRIOR ART LITERATURE

Patent Literatures

Patent literature 1: International Publication No. WO/2012/057134
Patent literature 2: International Publication No. WO/2011/086992
Patent literature 3: International Publication No. WO/2012/121152

SUMMARY OF THE INVENTION

Problems to be Solved by the Invention

However, in the case of decoding processing comprising homomorphic operation and non-homomorphic operation, it is impossible to perform decoding using the cloud-managed key according to the self-correcting technique.

Means to Solve the Problems

A decoding apparatus performs self-correcting processing with a decoding capability providing apparatus which holds a decoding key for decoding first ciphertext which can be decoded by homomorphic operation, obtains a decoding value of the first ciphertext, performs non-homomorphic operation using a value corresponding to or deriving from the decoding value of the first ciphertext and an addition value, and outputs plaintext.

Effects of the Invention

According to the present invention, because self-correcting processing is used only in decoding processing of first ciphertext which can be decoded by homomorphic operation, even if decoding processing comprises homomorphic operation and non-homomorphic operation, it is possible to perform decoding using a cloud-managed key according to a self-correcting technique.

DETAILED DESCRIPTION OF THE EMBODIMENTS

Figure 1:
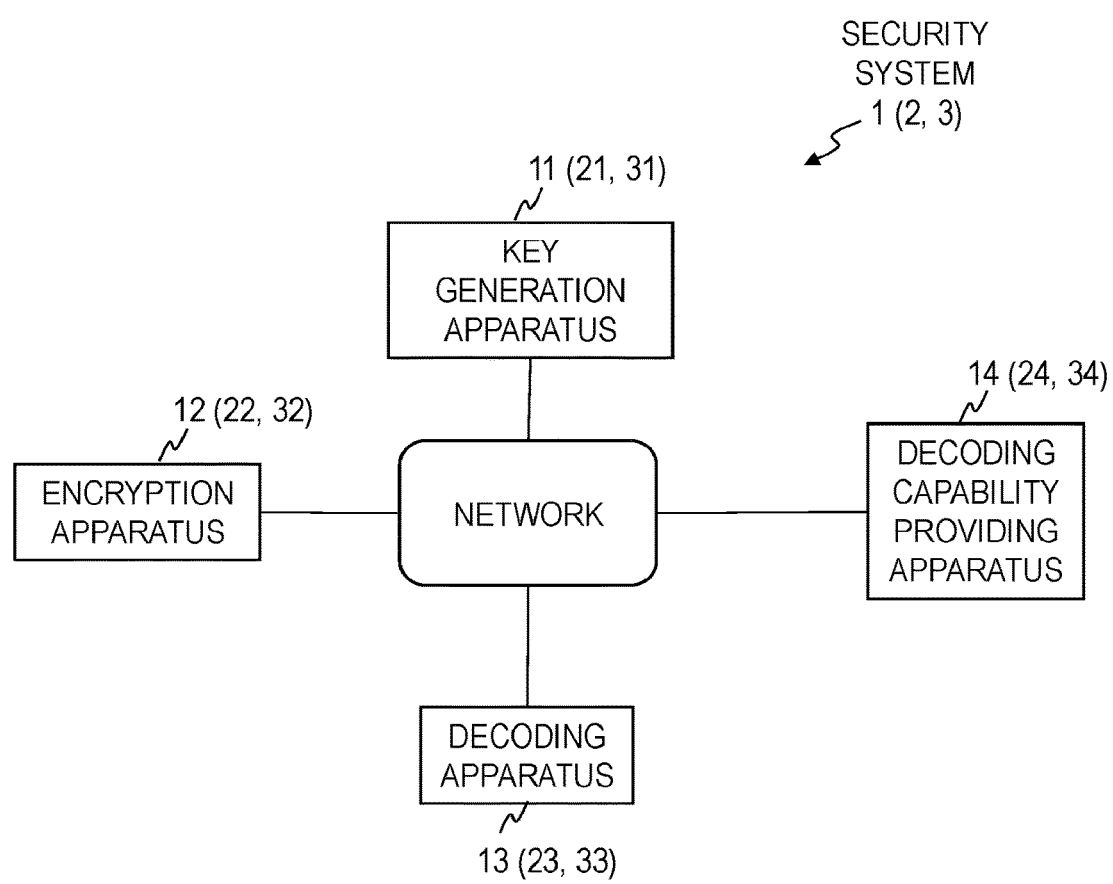
FIG. 1 is a block diagram of a security system according to embodiments.

Embodiments of the present invention will be described below.
[Principle]
In each embodiment, a decoding apparatus performs self-correcting processing with a decoding capability providing apparatus which holds a decoding key for decoding first ciphertext which can be decoded by homomorphic operation to obtain a decoding value of the first ciphertext, performs non-homomorphic operation using a value corresponding to or deriving from the decoding value of the first ciphertext and an addition value, and outputs plaintext. The plaintext is a decoding value of second ciphertext corresponding to information comprising the first ciphertext. A "value B deriving from A" means (1) information of A or part of A, or (2) a function value of information of A or part of A, or (3) a function value of information comprising information of A or part of A and other information. The "value B deriving from A" is, for example, "B corresponding to A". The "value B deriving from A" is, for example, "B based on A". Further, "B comprising A" means (1) B is A, or (2) B comprises A as an element, or (3) part of B is A (for example, bits of part of B represent A).

<Example 1 of Second Ciphertext>

The second ciphertext is, for example, ciphertext corresponding to the first ciphertext which can be decoded by homomorphic operation and an addition value which becomes an operand of non-homomorphic operation upon decoding (for example, ciphertext comprising the first ciphertext and the addition value). The decoding apparatus which decodes such second ciphertext performs self-correcting processing with the decoding capability providing apparatus which holds a decoding key for decoding the first ciphertext to obtain a decoding value of the first ciphertext. The first ciphertext can be decoded by homomorphic operation, and such decoding of the first ciphertext can be executed using a publicly known decoding method using a cloud-managed key according to a self-correcting technique (see, for example, Patent literatures 1 to 3, or the like). Further, the decoding apparatus performs non-homomorphic operation using the decoding value of the first ciphertext and the addition value to output a decoding value of the second ciphertext. In this manner, because self-correcting processing is used only in decoding processing of the first ciphertext which can be decoded by homomorphic operation, even if the second ciphertext comprises an addition value which becomes an operand of non-homomorphic operation upon decoding, it is possible to perform decoding using a cloud-managed key according to a self-correcting technique.

Examples of the first ciphertext comprise a value obtained by encrypting a value deriving from a random value (for example, a value obtained by encrypting a value corresponding to a random value), and examples of the addition value in this case comprise a value comprising a value corresponding to information comprising plaintext and the random value (for example, a value corresponding to the plaintext and the random value). In the example of the first ciphertext, preferably, it is difficult (for example, impossible) to obtain a decoding value of the second ciphertext only from the decoding value of the first ciphertext. "Difficult to obtain a decoding value" means, for example, that it is impossible to obtain a decoding value within polynomial time. The "polynomial time" means, for example, a period (calculation period) which can be expressed with a polynomial having a size (length) of the decoding key. In other words, the "polynomial time" means, for example, a period (calculation period) which can be expressed with an arbitrary polynomial for $\chi$ when the length (for example, a bit length) of the decoding key is set as $\chi$. Examples of the first ciphertext also comprise a value comprising a value obtained by encrypting a value deriving from informnnation comprising plaintext (for example, a value obtained by encrypting a value corresponding to the plaintext), and the addition value in this case is a value comprising a value deriving from information comprising the first ciphertext and the random value (for example, a value corresponding to the first ciphertext and the random value). Examples of a value corresponding to a value $\theta$ (such as a random value and plaintext) comprise information indicating the value $\theta$ or its mapping, information indicating part of information indicating the value $\theta$ or its mapping, information comprising information indicating the value $\theta$ or its mapping, information comprising information indicating part of information indicating the value $\theta$ or its mapping, other mapping of inverse mapping for obtaining the value $\theta$, and other mapping of information comprising information indicating inverse mapping for obtaining the value $\theta$.

Here, when the first ciphertext comprises the value obtained by encrypting the value deriving from the random value (for example, the value obtained by encrypting the value corresponding to the random value), the addition value is a value comprising the value corresponding to information comprising the plaintext and the random value (for example, the value corresponding to the plaintext and the random value), and it is difficult (for example, impossible) to obtain the decoding value of the second ciphertext only from the decoding value of the first ciphertext, even if information of the first ciphertext is provided to the decoding capability providing apparatus, unless information of the addition value is provided to the decoding capability providing apparatus, information of the decoding value of the second ciphertext is not leaked to the decoding capability providing apparatus. Therefore, in this case, the decoding apparatus may provide the information of the first ciphertext to the decoding capability providing apparatus without disturbing the information (for example, the decoding apparatus may provide information indicating the first ciphertext to the decoding capability providing apparatus), and may obtain information for obtaining the decoding value of the first ciphertext from the decoding capability providing apparatus without obtaining information of the decoding key from the decoding capability providing apparatus. By this means, it is possible to reduce an operation amount of the decoding apparatus for disturbing the information of the first ciphertext. However, this is one example, and, in this case, the decoding apparatus may provide information in which the first ciphertext is disturbed to the decoding capability providing apparatus, and obtain information for obtaining a decoding value from the decoding capability providing apparatus.

Meanwhile, if information of the decoding value of the second ciphertext can be obtained from the decoding value of the first ciphertext, it is desirable that the decoding apparatus provides information in which the first ciphertext is disturbed to the decoding capability providing apparatus and obtain information for obtaining the decoding value of the first ciphertext from the decoding capability providing apparatus without obtaining the information of the decoding key from the decoding capability providing apparatus.

Specific examples of the first ciphertext comprise ciphertext generated by homomorphic encryption method which is OW-CPA secure (ciphertext which is OW-CPA secure for the decoding value of the first ciphertext), specific examples of the second ciphertext corresponding to the first ciphertext and the addition value comprise ciphertext generated by non-homomorphic encryption method which is IND-CCA secure (ciphertext which is IND-CCA secure for plaintext). The OW-CPA secure encryption method and the IND-CCA secure encryption method based on this will be described below.

<Exemplary Method 1>

The exemplary method 1 is based on public key cryptography.

<<OW-CPA Secure Encryption Method 1-1>>

Key generation algorithm: KeyGen($1^\lambda$)→(pk, sk)

Encryption algorithm: Enc(pk, $M_1$)→$C_0$

Decoding algorithm: $Dec(sk, C_0) \to M_1'$ where $\lambda$ indicates a security parameter which is an integer of 1 or greater, $1^\lambda$ indicates a sequence comprised of $\lambda$ 1s, pk indicates a public key (encryption key) of public key cryptography, sk indicates a secret key (decoding key) corresponding to pk. $KeyGen(1^\lambda) \to (pk, sk)$ indicates operation to obtain (pk, sk) by using $1^\lambda$, $Enc(pk, M_1) \to C_0$ indicates homomorphic operation encrypting $M_1$ according to public key cryptography with pk to obtain $C_0$, and $Dec(sk, C_0) \to M_1'$ indicates homomorphic operation decoding $C_0$ according to public key cryptography with sk to obtain $M_1'$. Examples of the OW-CPA secure encryption method 1-1 comprise RSA encryption, ElGamal encryption, modified-ElGamal encryption, Paillier encryption, or the like.

<<IND-CCA Secure Encryption Method 1-2 Based on the OW-CPA Secure Encryption Method 1-1>>

Key generation algorithm: $KeyGen(1^\lambda) \to (pk, sk)$

Encryption algorithm: $Enc\_FO(pk) \to C = (C_1, C_2) = (Enc(pk, \alpha), FO(Q, r))$ Decoding algorithm: $Dec\_FO(sk, C) \to k$ where r indicates a random value, and $\alpha$ and k indicate values deriving from r (for example, values corresponding to r). $Enc\_FO(pk) \to C$ indicates operation to obtain ciphertext C corresponding to the random value r using pk, $Enc(pk, \alpha) \to C_1$ indicates homomorphic operation encrypting $\alpha$ with pk to obtain ciphertext $C_1$. $FO(Q, r) \to C_2$ indicates non-homomorphic operation to obtain a value $C_2$ deriving from information comprising Q and r, where Q is a value deriving from $\alpha$. Because $\alpha$ and k derive from r, Q is a value corresponding to plaintext k. $Dec\_FO(sk, C) \to k$ indicates non-homomorphic operation decoding C with sk to obtain k. This $Dec\_FO(sk, C)$ comprises homomorphic operation of $Dec(sk, C_1) \to Q$ for decoding ciphertext $C_1$ with a secret key sk to obtain a restored value Q, and non-homomorphic operation of $FO^{-1}(Q, C_2) \to r$ which is inverse operation of FO. In the case of the exemplary method 1, the first ciphertext is $C_1$, the addition value is $C_2$, and the second ciphertext is $C = (C_1, C_2)$. The plaintext is k, and, for example, a common key. However, the plaintext k may be message. Specific examples of the exemplary method 1 comprise a PSEC-KEM method (see Reference literatures 1 and 2, or the like).

Reference literature 1: PSEC-KEM specifications, Nippon telegraph and telephone corporation, NTT information platform laboratories, Apr. 14, 2008

Reference literature 2: INTERNATIONAL STANDARD ISO/IEC 18033-2 "Information technology—Security techniques—Encryption algorithms—Part 2:Asymmetric ciphers"

<Exemplary Method 2>

The exemplary method 2 is based on ID-based encryption method.

<<OW-CPA Secure Encryption Method 2-1>>

Setting algorithm: $Setup(1^\lambda) \to (PK, msk)$

Key generation algorithm: $KeyGen(PK, id, msk) \to sk_{id}$

Encryption algorithm: $Enc(PK, id, M) \to c_0$

Decoding algorithm: $Dec(PK, sk_{id}, c_0) \to M'$

Capsulation algorithm:

$Setup_{EC}(1^\lambda) \to pub$ $S(1^\lambda, pub) \to (r, com, dec)$ $R(pub, com, dec) \to r'$ or $\{\bot\}$ where PK indicates a public key (public parameter) of the ID-based encryption method, msk indicates a master secret key of PK, id indicates an identifier, and $sk_{id}$ indicates a secret key corresponding to the identifier id. pub indicates a public parameter for capsulation, r, com, dec respectively indicate random values, and $\{\bot\}$ indicates an error. $Setup(1^\lambda) \to (PK, msk)$ indicates operation to obtain (PK, msk) by using $1^\lambda$, $KeyGen(PK, id, msk) \to sk_{id}$ indicates operation to obtain $sk_{id}$ by using PK, id, msk, $Enc(PK, id, M) \to c_0$ indicates homomorphic operation encrypting M according to the ID-based encryption method with PK, id to obtain $c_0$, and $Dec(PK, sk_{id}, c_0) \to M'$ indicates homomorphic operation decoding $c_0$ according to the ID-based encryption method with PK, $sk_{id}$ to obtain M'. $Setup_{EC}(1^\lambda) \to pub$ indicates operation to obtain pub by using $1^\lambda$, $S(1^\lambda, pub) \to (r, com, dec)$ indicates operation to obtain (r, com, dec) by using $(1^\lambda, pub)$, and $R(pub, com, dec) \to r'$ or $\{\bot\}$ indicates operation to obtain r' or $\{\bot\}$ by using (pub, com, dec). One example of the ID-based encryption method is disclosed in, for example, Reference literature 3.

Reference literature 3: D. Boneh and M. Franklin, "Identity-Based Encryption from the Weil Pairing," Adv. in Cryptology|Crypto 2001, LNCS vol. 2139, Springer-Verlag, pp. 213-229, 2001. Full version in STAM J. Computing 32(3): 586-615, 2003.

<<IND-CCA Secure Encryption Method 2-2 Based on OW-CPA Secure Encryption Method 2-1>>

Setting Algorithm:

$Setup(1^\lambda) \to (PK, msk)$ $Setup_{EC}(1^\lambda) \to pub$

Encryption Algorithm:

$S(1^\lambda, pub) \to (r, com, dec)$ $Enc(PK, com, M|dec) \to c_0$ $MAC(r, c_0) \to tag$ $C = (com, c_0, tag)$ Decoding algorithm:

$KeyGen(PK, com, msk) \to sk_{com}$ $Dec(PK, sk_{com}, c_0) \to M'|dec'$ $R(pub, com, dec') \to r'$ if $r' \neq \{\bot\}$, $Vefy(r', c_0, tag)$ if $Vefy(r', c_0, tag) \neq \{\bot\}$, M' is outputted where M|dec indicates a value concatenating information indicating M and information indicating dec, $MAC(r, c_0) \to tag$ indicates operation for obtaining a message authentication code tag for $(r, c_0)$, and $Vefy(r', c_0, tag)$ indicates a verification result of the message authentication code tag for $(r', c_0)$.

In the case of the exemplary method 2, the first ciphertext is a value $c_0$ obtained by encrypting a value M|dec deriving from the plaintext M (value corresponding to the plaintext M), and the addition value is a message authentication code tag deriving from information comprising the first ciphertext $c_0$ and the random value r (corresponding to the first ciphertext $c_0$ and the random value r). The second ciphertext is $C = (com, c_0, tag)$. Specific examples of the exemplary method 2 comprise a method in which the ID-based encryption method is transformed using BK transform (Reference literature 4). In the case of the method of Reference literature 4, the plaintext M is message.

Reference literature 4: Dan Boneh1, Jonathan Katz, "Improved Efficiency for CCA-Secure Cryptosystems Built Using Identity-Based Encryption," In proceedings of RSA-CT '05, LNCS 3376, pp. 87-103, 2005.

<Example 2 of the Second Ciphertext>

The second ciphertext may comprise the first ciphertext which can be decoded by homomorphic operation (for example, although the second ciphertext is the first ciphertext, the second ciphertext cannot be decoded to the plaintext only by decoding processing of the first ciphertext), and may be one from which the plaintext can be restored by non-homomorphic operation using the value deriving from the decoding value of the first ciphertext and an addition value deriving from the decoding value of the first ciphertext. A decoding apparatus which decodes such second ciphertext performs self-correcting processing with the decoding capability providing apparatus which holds a decoding key for decoding the first ciphertext to obtain a decoding value of the first ciphertext. The first ciphertext can be decoded by homomorphic operation, and decoding of such first ciphertext can be executed according to a publicly known decoding method using a cloud-managed key according to a self-correcting technique (see, for example, Patent literatures 1 to 3, or the like). Further, the decoding apparatus performs non-homomorphic operation using a value deriving from the decoding value of the first ciphertext and the addition value deriving from the decoding value of the first ciphertext to obtain plaintext and outputs the plaintext. In this manner, because self-correcting processing is used only in decoding processing of the first ciphertext which can be decoded by homomorphic operation, even if an addition value which becomes an operand of non-homomorphic operation upon restoration of the plaintext is comprised, it is possible to perform decoding using a cloud-managed key according to a self-correcting technique.

Also in the case of the example 2 of the second ciphertext, the first ciphertext is ciphertext based on a homomorphic encryption method which is OW-CPA secure (ciphertext which is OW-CPA secure for the decoding value of the first ciphertext). The second ciphertext is ciphertext which is IND-CCA secure for plaintext. The encryption method which is IND-CCA secure in the example 2 of the second ciphertext will be described below (see Reference literature 5). This example is also based on the above-mentioned encryption method 1-1 which is OW-CPA secure.

Reference literature 5: RSAES-OAEP Encryption Scheme: Algorithm specification and supporting documentation, RSA Laboratories, RSA Security Inc.

<<IND-CCA Secure Encryption Method 3-1 Based on OW-CPA Secure Encryption Method 1-1>>

Key generation algorithm: KeyGen($1^\lambda$)→(pk, sk)
Encryption algorithm: Enc(pk, Encode($M_3$, P))→$C_{31}$
Decoding algorithm: Decode(Dec(sk, $C_{31}$), P)→$M_3$' where $M_3$ is plaintext, and P is an encoding parameter. P may be empty. Enc(pk, Encode($M_3$, P))→$C_{31}$ indicates homomorphic operation encrypting Encode($M_3$, P) with pk to obtain ciphertext $C_{31}$. Encode ($M_3$, P) indicates non-homomorphic operation which receives $M_3$ and P as input, generates seed which is a random value internally, and obtains a value MS=Encode($M_3$, P) deriving from information comprising $M_3$, P, seed. Specific examples of the non-homomorphic operation Encode comprise operation comprising EME-OAEP-Encode in Reference literature 5. Decode(Dec(sk, $C_{31}$), P)→$M_3$' indicates operation for obtaining a decoding value MS'=Dec(sk, $C_{31}$) of $C_{31}$ by homomorphic operation Dec with sk, and obtaining plaintext $M_3$' by non-homomorphic operation Decode (MS', P) using the decoding value MS' of $C_{31}$ and addition values seed' and P deriving from the decoding values MS'. The addition value seed' matches the random value seed. Specific examples of the non-homomorphic operation Decode comprise operation comprising EME-OAEP-Decode in Reference literature 5. The first ciphertext $C_{31}$ is a value obtained by encrypting the value MS deriving from the plaintext $M_3$ and information comprising seed which is a random value. The addition value seed' is a value deriving from information comprising the random value seed. The second ciphertext in this example is the first ciphertext $C_{31}$.

Each embodiment will be described below with reference to the drawings.

[First Embodiment]

A first embodiment will be described. The first embodiment is an example where the second ciphertext $C_{10}$ based on the PSEC-KEM method disclosed in Reference literature 1 is decoded. In this embodiment, the first ciphertext is a value $C_{11}$ obtained by encrypting a value α (value corresponding to r) deriving from the random value r, and the addition value is a value $C_{12}$ corresponding to information comprising plaintext (common key) k (value corresponding to the random value r and the value α) and the random value r. In other words, the addition value $C_{12}$ is information deriving from information comprising α and r. It is difficult to obtain the random value r only from the decoding value Q of the first ciphertext $C_{11}$, and the decoding value of the second ciphertext $C_{10}$ is a common key k obtained from the random value r. That is, it is difficult to obtain the common key k which is the decoding value of the second ciphertext $C_{10}$ only from the decoding value Q of the first ciphertext $C_{11}$.

<Configuration>

As illustrated in FIG. 1, a security system 1 of the first embodiment comprises a key generation apparatus 11, an encryption apparatus 12, a decoding apparatus 13 and a decoding capability providing apparatus 14, which are configured to be able to exchange information with each other through a network. It should be noted that while FIG. 1 illustrates one key generation apparatus 11, one encryption apparatus 12, one decoding apparatus 13 and one decoding capability providing apparatus 14 to simplify the explanation, there may be a plurality of apparatuses of at least part of these apparatuses.

Figure 2:
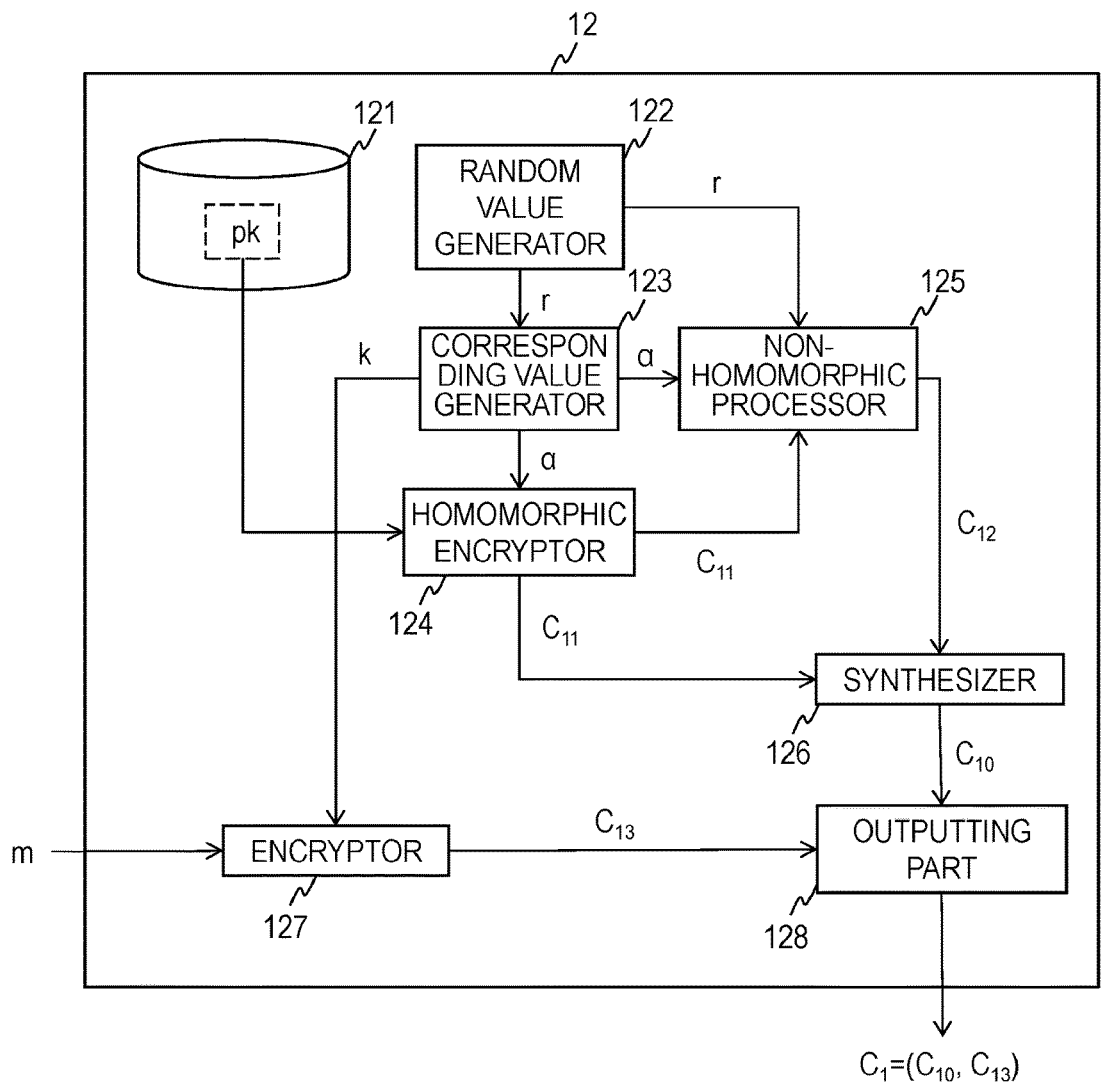
FIG. 2 is a block diagram of an encryption apparatus according to a first embodiment.
Figure 3A:
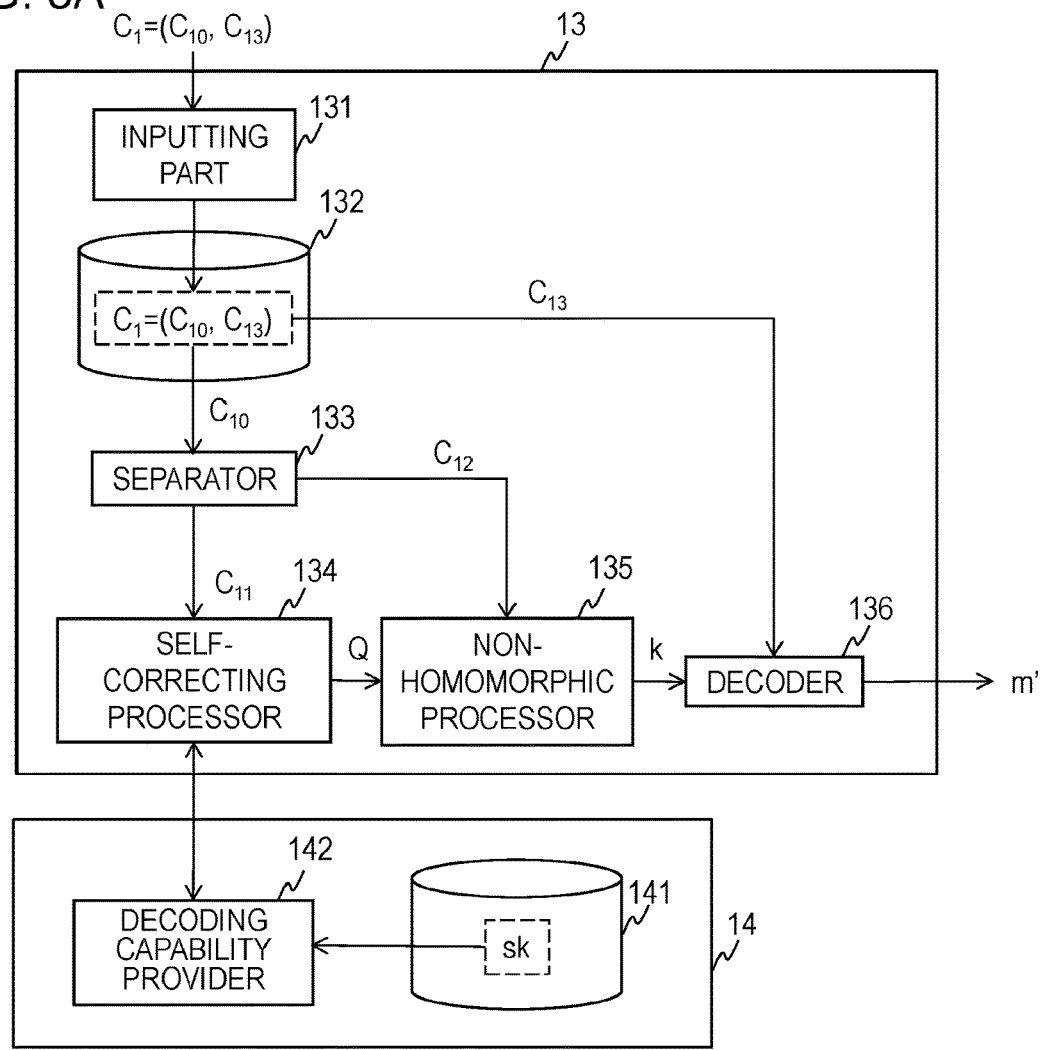
FIG. 3A is a block diagram of a decoding apparatus and a decoding capability providing apparatus according to the first embodiment.
Figure 3B:
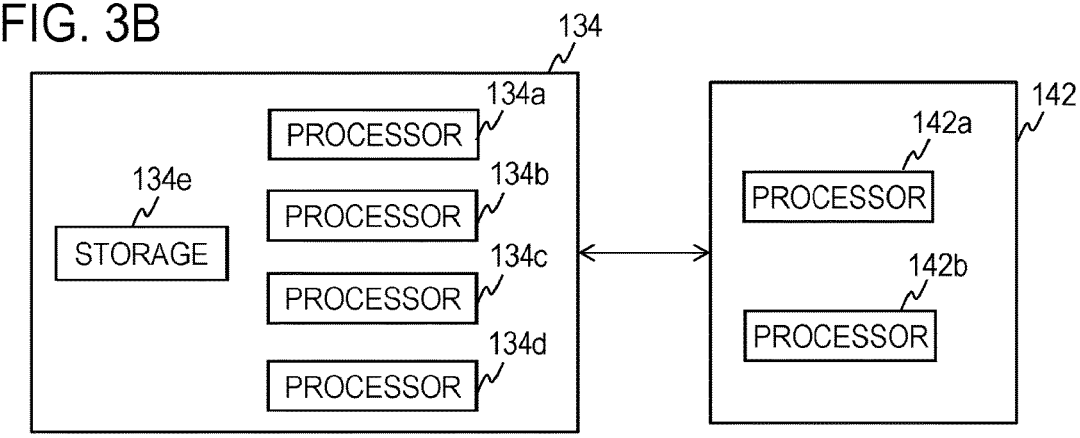
FIG. 3B is a block diagram illustrating details of a self-correcting processor and a decoding capability provider 142 according to the first embodiment.

As illustrated in FIG. 2, the encryption apparatus 12 of the present embodiment comprises a storage 121, a random value generator 122, a corresponding value generator 123, a homomorphic encryptor 124, a non-homomorphic processor 125, a synthesizer 126, an encryptor 127 and an outputting part 128. As illustrated in FIG. 3, the decoding apparatus 13 of the present embodiment comprises an inputting part 131, a storage 132, a separator 133, a self-correcting processor 134, a non-homomorphic processor 135 and a decoder 136. As illustrated in FIG. 3, the decoding capability providing apparatus 14 of the present embodiment comprises a storage 141 and a decoding capability provider 142. Each of the key generation apparatus 11, the encryption apparatus 12, the decoding apparatus 13 and the decoding capability providing apparatus 14 is, for example, an apparatus configured with a general purpose or dedicated computer comprising a processor (hardware processor) such as a CPU (central processing unit) and a memory such as a RAM (random-access memory) and a ROM (read-only memory) executing a predetermined program. The computer may comprise one processor or memory, or may comprise a plurality of processors and memories. The program may be installed in the computer or recorded in a ROM, or the like, in advance. Further, part or all of the processing parts may be configured with an electronic circuitry which implements a processing function alone instead of an electronic circuitry which implements a configuration of functions by a program being loaded as with a CPU. Further, an electronic circuitry configuring one apparatus may comprise a plurality of CPUs. Information outputted from each processing part is stored in a temporary memory which is not illustrated, read out as necessary and used for processing in each processing part.

<Processing>

The key generation apparatus 11 executes the key generation algorithm KeyGen($1^\lambda$) to obtain a public key pk and a secret key sk. The public key pk is stored in the storage 121 of the encryption apparatus 12 (FIG. 2). Further, the public key pk is also set for other apparatuses. The secret key sk is safely stored in the storage 141 of the decoding capability providing apparatus 14 (FIG. 3).

Figure 4:
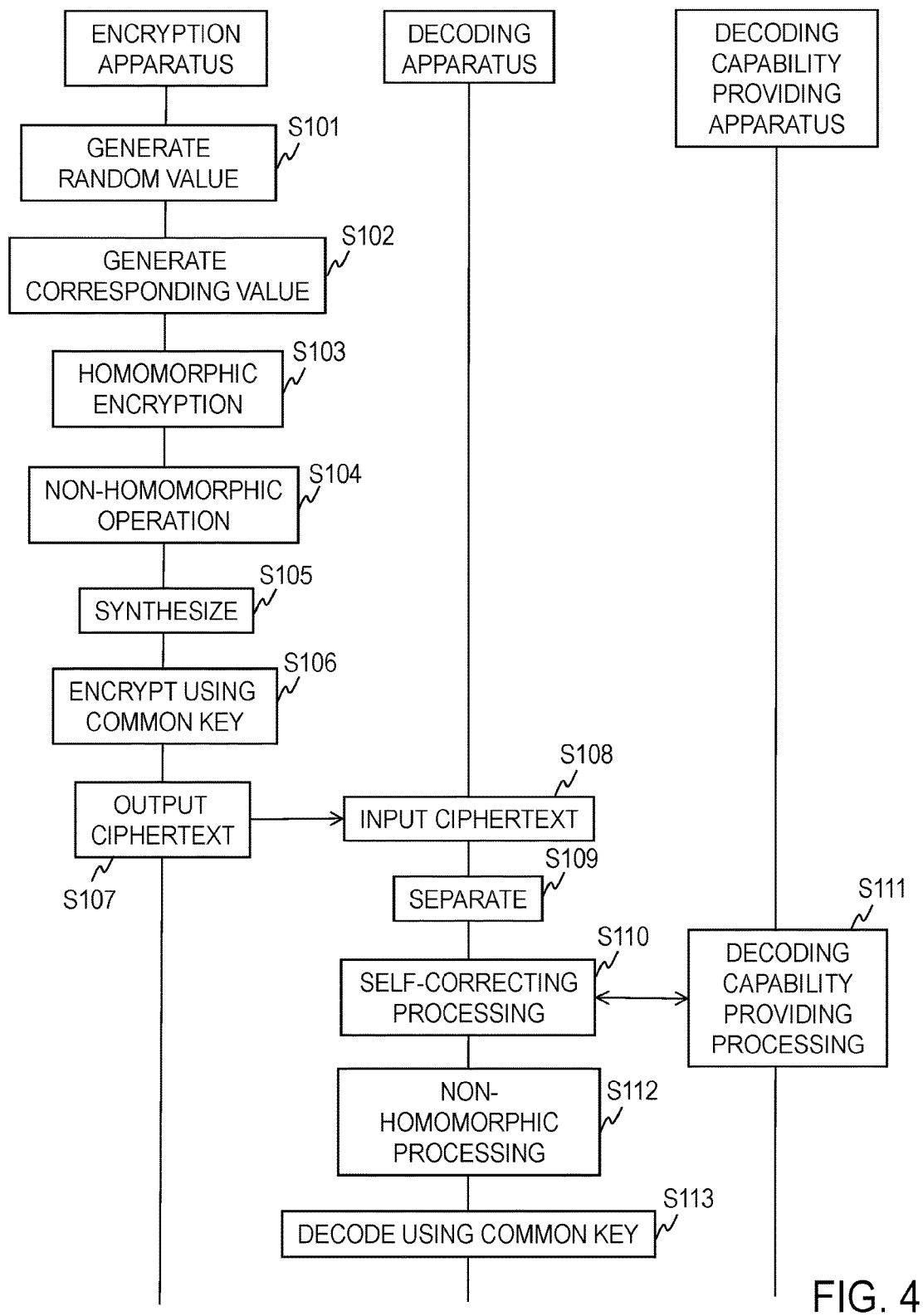
FIG. 4 is a diagram for explaining decoding processing according to the first embodiment.

Subsequently, as illustrated in FIG. 4, the random value generator 122 of the encryption apparatus 12 generates and outputs a random value r (step S101). The corresponding value generator 123 receives the random value r as input and generates and outputs values (values corresponding to r) α, k deriving from the random value r (step S102). For example, H is a bit sequence indicating a hash value of information comprising information indicating the random value r; H=t|k; and α is a function value of t. k is a common key. Note that A|B indicates concatenation of bit sequences A and B. Which position in H is set as t and k is determined in advance.

The homomorphic encryptor 124 receives the value α and the public key pk as input, obtains and outputs the first ciphertext $C_{11}$=Enc(pk, α) (step S103). The first ciphertext $C_{11}$ is ciphertext which can be decoded by homomorphic operation. For example, the first ciphertext $C_{11}$ satisfies pk=sk·$P_E$∈E with respect to a point $P_E$ on an elliptic curve E, and is α∈E, and $C_{11}$=Enc(pk, α)=α·$P_E$∈E.

The non-homomorphic processor 125 receives the random value r, the first ciphertext $C_{11}$ and the value α as input, and obtains and outputs the addition value $C_{12}$=FO(α, r) (step S104). The addition value $C_{12}$ is a value which becomes an operand of the non-homomorphic operation upon decoding. For example, $C_{12}$=FO(α, r) is exclusive OR of a bit sequence indicating a hash value of information comprising information indicating $C_{11}$ and information indicating Q=α·pk=α·sk·$P_E$∈E and a bit sequence indicating the random value r. The value α and the plaintext k correspond to the random value r. Therefore, the addition value $C_{12}$=FO(α, r) corresponds to the plaintext k and the random value r.

The synthesizer 126 receives the first ciphertext $C_{11}$ and the addition value $C_{12}$ as input and obtains and outputs the second ciphertext $C_{10}$ corresponding to these (step S105). For example, $C_{10}$ is information comprising information indicating $C_{11}$ and information indicating $C_{12}$, and is, for example, a value concatenating the information indicating $C_{11}$ (for example, a bit sequence) and the information indicating $C_{12}$ (for example, a bit sequence).

The encryptor 127 receives input message m and a common key k as input, encrypts the input message m with the common key k according to common key cryptography, and outputs common key ciphertext $C_{13}$ (step S106). Examples of the common key cryptography comprise AES and Cameria (Registered trademark).

The outputting part 128 receives the second ciphertext $C_{10}$ and the common key ciphertext $C_{13}$ as input and outputs ciphertext $C_1$=($C_{10}$, $C_{13}$) comprising these (step S107). The ciphertext $C_1$ is transmitted to the decoding apparatus 13 through a network.

The ciphertext $C_1$ is inputted to the inputting part 131 of the decoding apparatus 13 (FIG. 3), and stored in the storage 132 (step S108). The separator 133 receives the second ciphertext $C_{10}$ comprised in the ciphertext $C_1$=($C_{10}$, $C_{13}$) as input, obtains the first ciphertext $C_{11}$ and the addition value $C_{12}$ from the second ciphertext $C_{10}$ and outputs the first ciphertext $C_{11}$ and the addition value $C_{12}$ (step S109).

The self-correcting processor 134 receives the first ciphertext $C_{11}$ as input, performs self-correcting processing (decoding processing using a cloud-managed key according to a self-correcting technique) with the decoding capability provider 142 of the decoding capability providing apparatus 14 which holds a secret key (decoding key) sk for decoding the first ciphertext $C_{11}$ in the storage 141, and obtains and outputs the decoding value Q=Dec(sk, $C_{11}$) of the first ciphertext $C_{11}$ (step S110, S111). As described above, the first ciphertext $C_{11}$ can be decoded by homomorphic operation. For example, the first ciphertext $C_{11}$ is Q=sk·$C_{11}$∈E (where $C_{11}$=α·$P_E$∈E) with respect to a point sk on the elliptic curve E and $C_{11}$.

<<Decoding Processing Using a Cloud-managed Key According to a Self-correcting Technique>>

The decoding processing using a cloud-managed key according to a self-correcting technique is a publicly known technique disclosed in Patent literatures 1 to 3, or the like. Outline of the processing will be described below.

The self-correcting processor 134 provides information corresponding to the first ciphertext $C_{11}$ to the decoding capability provider 142 of the decoding capability providing apparatus 14, and obtains information to be used by the self-correcting processor 134 to obtain the decoding value Q of the first ciphertext $C_{11}$ from the decoding capability providing apparatus 14 without obtaining information of the secret key (decoding key) sk from the decoding capability providing apparatus 14. In other words, the decoding capability provider 142 of the decoding capability providing apparatus 14 obtains information corresponding to the first ciphertext $C_{11}$ from the self-correcting processor 134 and outputs, to the self-correcting processor 134 information for obtaining the decoding value Q of the first ciphertext $C_{11}$ by self-correcting processing at the self-correcting processor 134 without providing information of the secret key (decoding key) sk to the decoding apparatus 13. The self-correcting processor 134 obtains the decoding value Q using the information provided from the decoding capability provider 142. Here, in order to avoid the decoding value Q from leaking to the decoding capability providing apparatus 14, the "informnation corresponding to the first ciphertext $C_{11}$" to be provided to the decoding capability provider 142 should be information in which the first ciphertext $C_{11}$ is disturbed. However, in the present embodiment, it is difficult to obtain the common key k which is a decoding value of the second ciphertext $C_{10}$ only from the decoding value Q. Therefore, even if the decoding value Q leaks to the decoding capability providing apparatus 14, information of the common key k is not leaked to the decoding capability providing apparatus 14. In such as case, the self-correcting processor 134 may provide the information of the first ciphertext $C_{11}$ to the decoding capability provider 142 without disturbing the first ciphertext $C_{11}$ (provides information of the first ciphertext $C_{11}$ which is not disturbed to the decoding capability provider 142) and obtain information to be used by the self-correcting processor 134 to obtain the decoding value Q from the decoding capability provider 142.

Specific example of the decoding processing using a cloud-managed key according to the self-correcting technique:

The decoding processing using the cloud-managed key according to the self-correcting technique will be described below. In the example described below, G, H are groups (for example, a finite Abelian group such as a cyclic group); f(x) is a homomorphic decoding function for decoding the first ciphertext x=$C_{11}$ which is an element of the group H with the secret key sk to obtain an element of the group G; X1, X2 are random variables having values in the group G; x1 is an realization of the random variable X1; x2 is a realization of the random variable X2; and a, b are natural numbers which are primes with respect to each other. Note that the following example does not limit the present invention, and other self-correcting techniques may be employed.

Step 110a: the processor 134a of the self-correcting processor 134 outputs first input information $\tau_1$ and second input information $\tau_2$ which correspond to the first ciphertext $x=C_{11}$ and which are elements of the group H. For example, the group H is a cyclic group; a generator of the cyclic group H is $\mu_h$; r1, r2 are random natural numbers of 0 or greater; and $\tau_1=\mu_h{}^{r1}x^b$, and $\tau_2=\mu_h{}^{r2}x^a$. One of a, b may be a constant such as 1. It should be noted that when the processor 134a of the self-correcting processor 134 provides the information of the first ciphertext $C_{11}$ to the decoding capability provider 142 without disturbing the first ciphertext $C_{11}$, natural numbers r1, r2 are constants of 1 or greater, and, for example, $\tau_1=\mu_h x^b$, and $\tau_2=\mu_h x^a$. When the natural numbers r1, r2 are constants, processing for randomly generating natural numbers r1, r2 is not required. The first input information $\tau_1$ and the second input information $\tau_2$ are transmitted to the decoding capability provider 142.

Step 111a: the processor 142a of the decoding capability provider 142 correctly calculates $f(\tau_1)$ with higher probability than given probability using the transmitted first input information $\tau_1$ and the secret key sk stored in the storage 141, sets the obtained calculation result as first output information $z_1$. That is, there is a case where $z_1=f(\tau_1)$ or a case where $z_1 \neq f(\tau_1)$. In other words, while the decoding capability provider 142 can calculate $f(\tau_1)$, there is a possibility that a calculation result comprising an intended or unintended error is outputted. The "given probability" is probability of lower than 100% and 0% or higher. Examples of the "given probability" comprise non-negligible probability, and examples of the "non-negligible probability" comprise probability of $1/\psi(k)$ or higher where $\psi(k)$ represents a polynomial which is non-decreasing function of a security parameter k. The first output information $z_1$ is transmitted to the self-correcting processor 134.

Step 111b: the processor 142b of the decoding capability provider 142 correctly calculates $f(\tau_2)$ with higher probability than given probability using the transmitted second input information $\tau_2$ and the secret key sk stored in the storage 141, and sets the obtained calculation result as second output information $z_2$. That is, there is a case where $z_2=f(\tau_2)$ or a case where $z_2 \neq f(\tau_2)$. In other words, while the decoding capability provider 142 can calculate $f(\tau_2)$, there is a possibility that the decoding capability provider 142 outputs a calculation result which comprises an intended or unintended error. The second output information $z_2$ is transmitted to the self-correcting processor 134.

Step 110b: the processor 134b of the self-correcting processor 134 generates a calculation result $u=f(x)^b x_1$ from the transmitted first output information $z_1$. For example, $v=f(\mu_h)$ and $u=z_1 v^{-r1}$. b and r1 are the same as those used in the processor 134a. The calculation result u is stored in the storage 134e.

Step 110c: the processor 134c of the self-correcting processor 134 generates a calculation result $v=f(x)^a x_2$ from the transmitted second output information $z_2$. For example, $v=z_2 v^{-r2}$. a and r2 are the same as those used in the processor 134a. The calculation result v is stored in the storage 134e.

Step 110d: the processor 134d of the self-correcting processor 134 determines whether any of sets of u and v stored in the storage 134e satisfies $u^a=v^b$, and if any of sets of u and b satisfies $u^a=v^b$, outputs the set of u and v which satisfies $u^a=v^b$ and $u^{b'}v^{a'}$ for integers a', b' which satisfies a'a+b'b=1 as the decoding value Q.

If the calculation results u and v do not satisfy $u^a=v^b$ even if processing of steps 110a to 110d, 111a and 111b are repeated a predetermined number of times, the self-correcting processor 134 outputs error information which indicates that decoding is impossible. If one or more v are stored in the storage 134e, the processing of step 110d may be also performed between step 110b and step 110c (end of explanation of <<decoding processing using a cloud-managed key according to a self-correcting technique>>).

The non-homomorphic processor 135 receives the decoding value Q and the addition value $C_{12}$ as input, performs non-homomorphic operation $FO^{-1}(Q, C_{12})$ using the decoding value Q and the addition value $C_{12}$ to obtain r, and, then, obtains and outputs a decoding value (plaintext) k of the second ciphertext $C_{10}$ (step S112). For example, the non-homomorphic processor 135 obtains a random value $r=FO^{-1}(Q, C_{12})$ using the decoding value Q and the addition value $C_{12}$, and outputs a common key k corresponding to the random value r. For example, first, the non-homomorphic processor 135 obtains exclusive OR of a bit sequence indicating a hash value of information comprising information indicating $C_{11}$ and information indicating the decoding value Q, and a bit sequence indicating the addition value $C_{12}$ as a bit sequence indicating the random value r. Then, the non-homomorphic processor 135 obtains a bit sequence h indicating a hash value of information comprising the information indicating the random value r, and obtains a common key k which satisfies h=t|k. Further, the non-homomorphic processor 135 confirms whether $C_{11}=\alpha \cdot P_E \in E$ is satisfied using a function value $\alpha$ of t, and outputs a common key k if $C_{11}=\alpha \cdot P_E \in E$ is satisfied, and outputs an error if $C_{11}=\alpha \cdot P_E \in E$ is not satisfied.

The decoder 136 receives common key ciphertext $C_{13}$ and the common key k as input, decodes the common key ciphertext $C_{13}$ with the common key k according to the common key cryptography and obtains and outputs a decoding value m' (step S113).

[Second Embodiment]

The second embodiment will be described. The second embodiment is an example where second ciphertext is decoded, the second ciphertext having been obtained by a method in which the ID-based encryption method disclosed in Reference literature 4 is BK transformed. In the present embodiment, the first ciphertext is a value $C_{21}$ obtained by encrypting a value m|dec corresponding to plaintext in, and the addition value is a message authentication code tag corresponding to the first ciphertext $C_{21}$ and the random value r.

<Configuration>

As illustrated in FIG. 1, a security system 2 of the second embodiment comprises a key generation apparatus 21, an encryption apparatus 22, a decoding apparatus 23 and a decoding capability providing apparatus 24, which are configured to be able to exchange information with each other through a network. It should be noted that while FIG. 1 illustrates one key generation apparatus 21, one encryption apparatus 22, one decoding apparatus 23 and one decoding capability providing apparatus 24 to simplify the explanation, there may be a plurality of apparatuses of at least part of these apparatuses.

Figure 5:
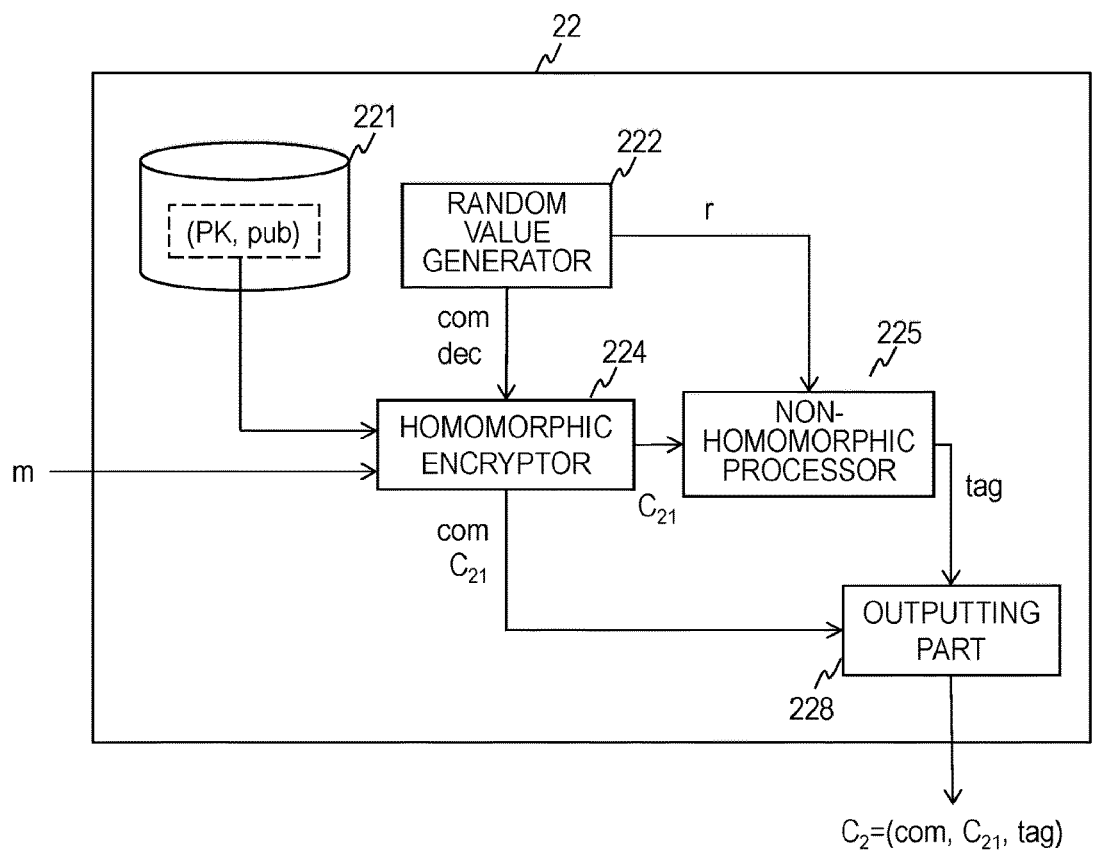
FIG. 5 is a block diagram of an encryption apparatus according to a second embodiment.
Figure 6:
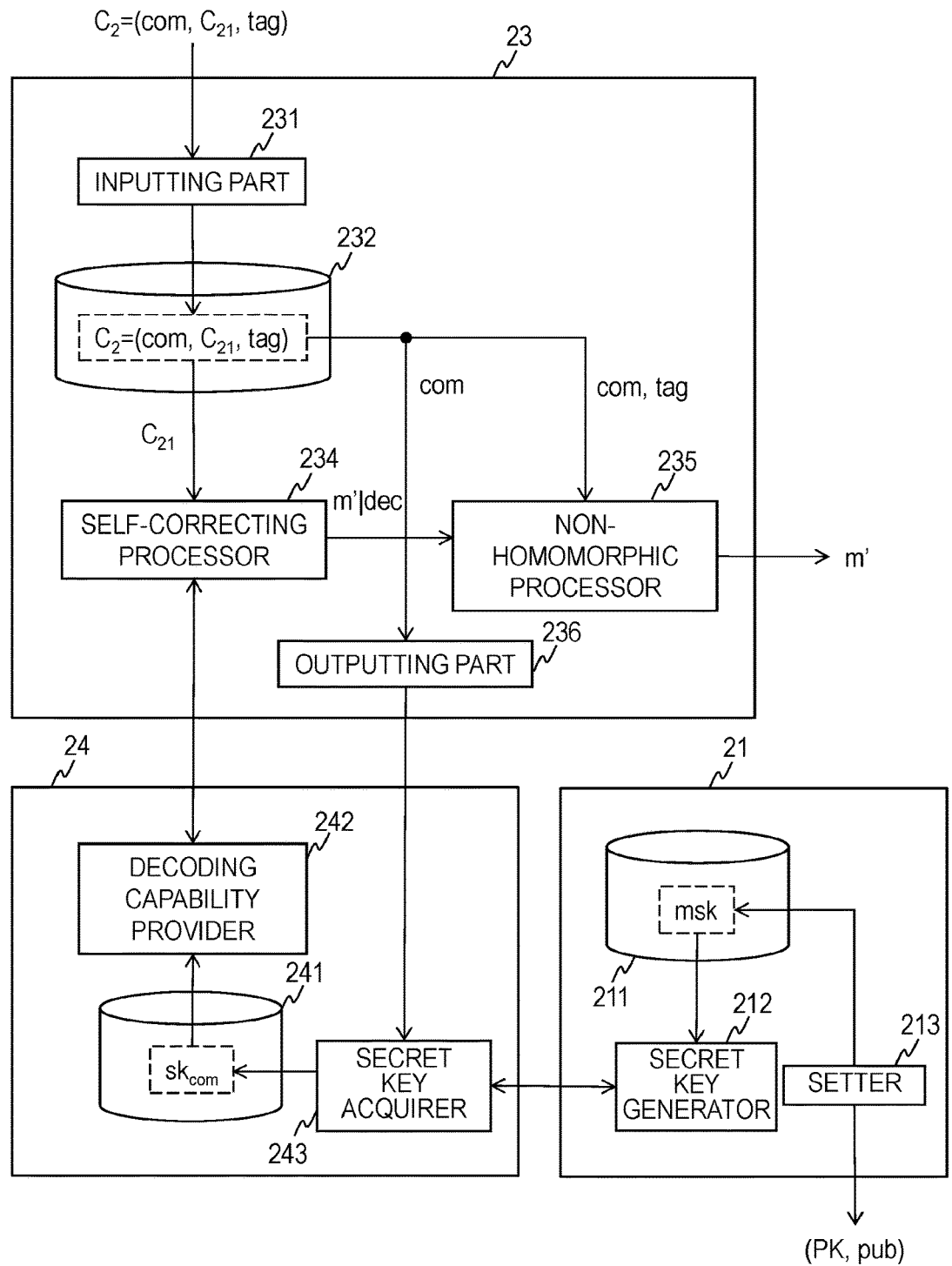
FIG. 6 is a block diagram of a decoding apparatus and a decoding capability providing apparatus according to the second embodiment.

As illustrated in FIG. 5, the encryption apparatus 22 of the present embodiment comprises a storage 221, a random value generator 222, a homomorphic encryptor 224, a non-homomorphic processor 225 and an outputting part 228. As illustrated in FIG. 6, the decoding apparatus 23 of the present embodiment comprises an inputting part 231, a storage 232, a self-correcting processor 234, a non-homomorphic processor 235 and an outputting part 236. As illustrated in FIG. 6, the decoding capability providing apparatus 24 of the present embodiment comprises a storage 241, a decoding capability provider 242 and a secret key acquirer 243. As illustrated in FIG. 6, the key generation apparatus 21 of the present embodiment comprises a storage 211, a secret key generator 212, and a setter 213. Each of the key generation apparatus 21, the encryption apparatus 22, the decoding apparatus 23 and the decoding capability providing apparatus 24 is, for example, an apparatus configured by a predetermined program being loaded to the above-mentioned computer. Information outputted from each processing part is stored in a temporary memory which is not illustrated, read out as necessary and used for processing in each processing part.

<Processing>

The setter 213 of the key generation apparatus 21 executes setting algorithm Setup($1^\lambda$) and Setup$_{EC}$($1^\lambda$) to obtain a public key (PK, pub) and a master secret key msk. The public key (PK, pub) is stored in the storage 221 of the encryption apparatus 22 (FIG. 5). Further, the public key (PK, pub) is also set for other apparatuses. The master secret key msk is safely stored in the storage 211 of the key generation apparatus 21.

Figure 7:
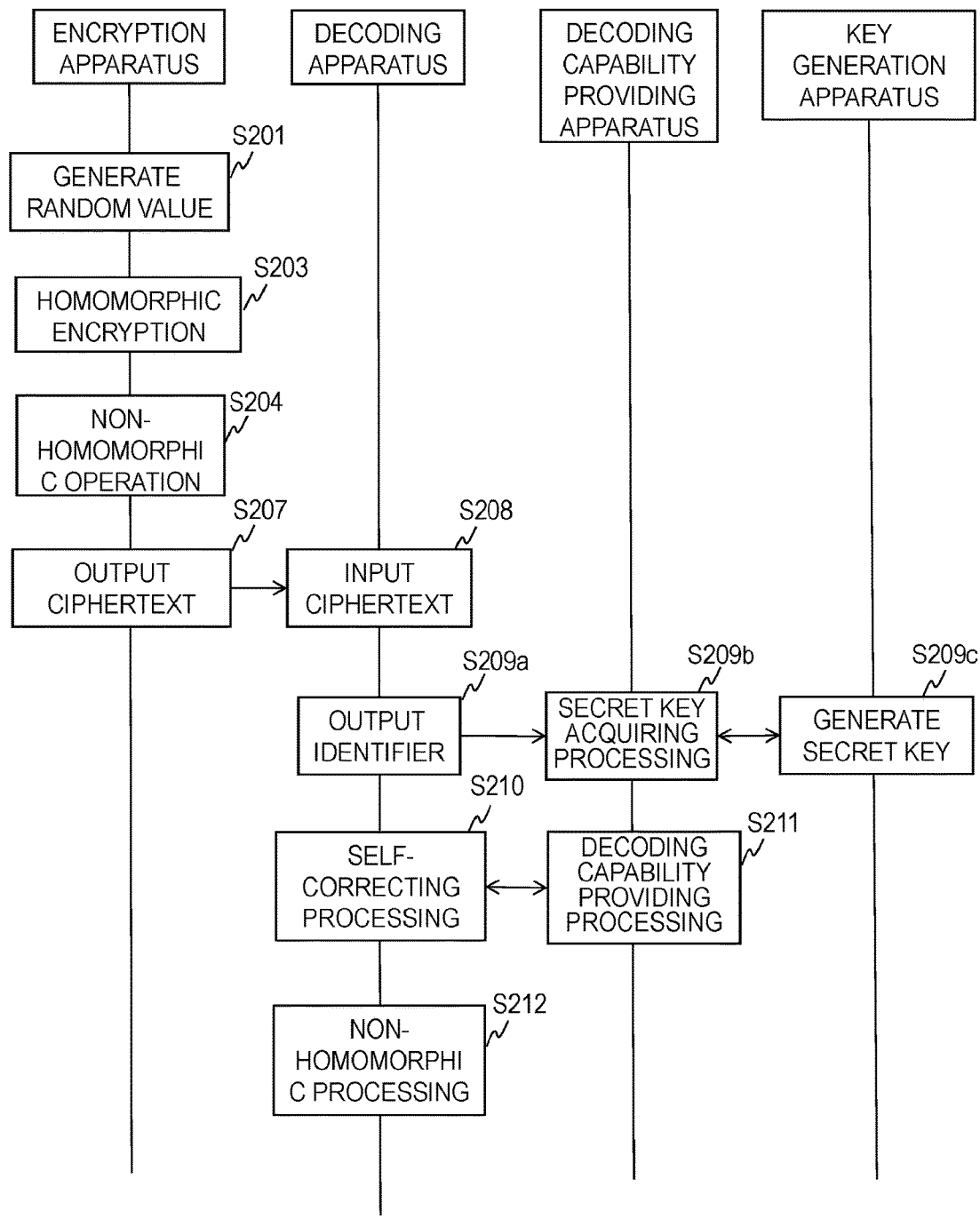
FIG. 7 is a diagram for explaining decoding processing according to the second embodiment.

As illustrated in FIG. 7, the random value generator 222 of the encryption apparatus 22 generates and outputs a random value (r, com, dec) by S($1^\lambda$, pub)→(r, com, dec) (step S201). com functions as an identifier.

The homomorphic encryptor 224 receives the public key PK, the random value dec, the identifier com and the plaintext m as input, encrypts a value m|dec corresponding to the plaintext in by Enc(PK, com, m|dec)→$C_{21}$, and outputs the first ciphertext $C_{21}$ (step S203). The first ciphertext $C_{21}$ is ciphertext which can be decoded by homomorphic operation.

The non-homomorphic processor 225 receives the random value r and the first ciphertext $C_{21}$ as input and obtains and outputs a message authentication code tag for the random value r and the first ciphertext $C_{21}$ by MAC(r, $C_{21}$)→tag as the addition value (step S204). The addition value tag is a value which becomes an operand of non-homomorphic operation upon decoding.

The outputting part 228 receives the identifier com, the first ciphertext $C_{21}$ and the addition value tag as input and outputs second cipher text $C_2$=(com, $C_{21}$, tag) corresponding to these (step S207). For example, the second ciphertext $C_2$ is information comprising information indicating the identifier com, information indicating the first ciphertext $C_{21}$, and information indicating the addition value tag, and, is, for example, a value concatenating the information indicating the identifier com (for example, a bit sequence), information indicating the first ciphertext $C_{21}$ (for example, a bit sequence) and information indicating the addition value tag (for example, a bit sequence). The second ciphertext $C_2$ is transmitted to the decoding apparatus 23 through a network.

The second ciphertext $C_2$ is inputted to the inputting part 231 of the decoding apparatus 23 (FIG. 6), and stored in the storage 232 (step S208). The outputting part 236 outputs the identified com comprised in the second ciphertext $C_2$=(com, $C_{21}$, tag) (step S209a). The identifier com is inputted to the secret key acquirer 243 of the decoding capability providing apparatus 24. The secret key acquirer 243 outputs the identifier com to the key generation apparatus 21 (step S209b). The secret key generator 212 of the key generation apparatus 21 receives the identifier com and the master secret key msk as input, and obtains and outputs a secret key $sk_{com}$ corresponding to the identifier com by KeyGen(PK, com, msk)→$sk_{com}$. The secret key $sk_{com}$ is inputted to the secret key acquirer 243 and safely stored in the storage 241 (step S290c).

The self-correcting processor 234 receives the first ciphertext $C_{21}$ comprised in the second cipher text $C_2$=(com, $C_{21}$, tag) as input, performs self-correcting processing (decoding processing using a cloud-managed key according to a self-correcting technique) with the decoding capability provider 242 of the decoding capability providing apparatus 24 which holds a secret key (decoding key) $sk_{com}$ for decoding the first ciphertext $C_{21}$, and obtains and outputs a decoding value m'|dec'=Dec(PK, $sk_{com}$, $C_{21}$) of the first ciphertext $C_{21}$ (steps S210, S211).

That is, the self-correcting processor 234 provides information corresponding to the first ciphertext $C_{21}$ to the decoding capability provider 242 of the decoding capability providing apparatus 24, and obtains information to be used by the self-correcting processor 234 to obtain the decoding value m'|dec' of the first ciphertext $C_{21}$ from the decoding capability providing apparatus 24 without obtaining information of the secret key (decoding key) $sk_{com}$ from the decoding capability providing apparatus 24. In other words, the decoding capability provider 242 of the decoding capability providing apparatus 24 obtains the information corresponding to the first ciphertext $C_{21}$ from the self-correcting processor 234 and outputs information to be used by the self-correcting processor 234 to obtain the decoding value m'|dec' of the first ciphertext $C_{21}$ by self-correcting processing to the self-correcting processor 234 without providing the information of secret key $sk_{com}$ to the decoding apparatus 23. The self-correcting processor 234 obtains the decoding value m'|dec' using the information provided from the decoding capability provider 242. Here, in order to avoid the decoding value m'|dec' from leaking to the decoding capability providing apparatus 24, it is desirable that the "information corresponding to the first ciphertext $C_{21}$" to be provided to the decoding capability provider 242 is information in which the first ciphertext $C_{21}$ is disturbed. Specific examples of step S210, S211 are the above-mentioned "specific examples of decoding processing using a cloud-managed key according to a self-correcting technique", which is performed by setting x=$C_2$, and the secret key sk=$sk_{com}$, substituting the self-correcting processor 234 for the self-correcting processor 134 and substituting the decoding capability provider 242 for the decoding capability provider 142.

The non-homomorphic processor 235 performs non-homomorphic operation using the decoding value m'|dec' of the first ciphertext $C_{21}$ and the addition value tag, and outputs a decoding value m' of the second ciphertext $C_2$ (step S212). For example, the non-homomorphic processor 235 receives the decoding value m'|dec', and the identifier com and the addition value tag comprised in the second ciphertext $C_2$=(com, $C_{21}$, tag) as input, obtains r' by R(pub, com, dec')→r', determines whether Vefy(r', $C_{21}$, tag)≠{⊥} if r'≠{⊥}, and outputs m' if Vefy(r', $C_{21}$, tag)≠{⊥}. Otherwise, the non-homomorphic processor 235 terminates the processing with an error.

[Third Embodiment]

The third embodiment will be described. The third embodiment is based on the above-mentioned <Example 2 of the second ciphertext>. The first ciphertext of the present embodiment is a value $C_{31}$ obtained by encrypting a value MS=Encode(m, P) deriving from the plaintext m and information comprising a random value seed, and the addition value is the random value seed.

<Configuration>

As illustrated in FIG. 1, a security system 3 of the third embodiment comprises a key generation apparatus 31, an encryption apparatus 32, a decoding apparatus 33 and a decoding capability providing apparatus 34, which are configured to be able to exchange information with each other through a network. It should be noted that while FIG. 1 illustrates one key generation apparatus 31, one encryption apparatus 32, one decoding apparatus 33 and one decoding capability providing apparatus 34 to simplify the explanation, there may be a plurality of apparatuses of at least part of these apparatuses.

Figure 8:
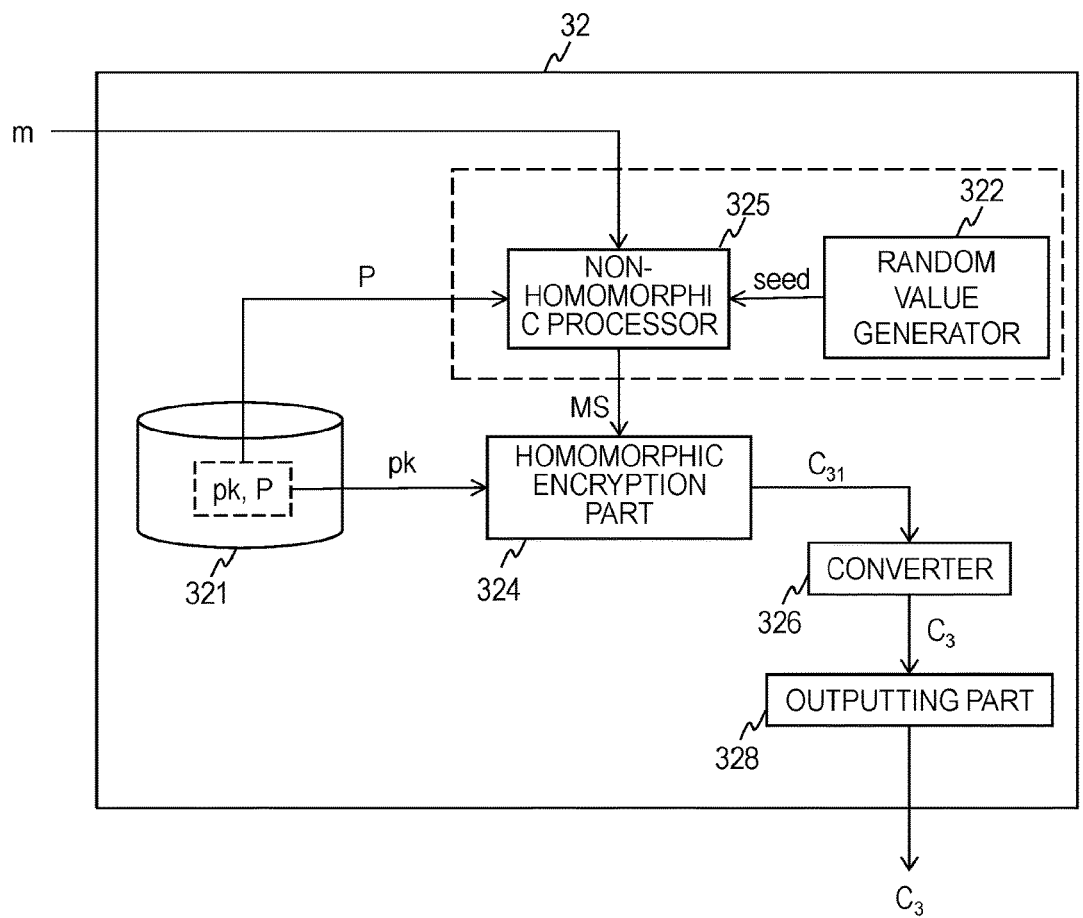
FIG. 8 is a block diagram of an encryption apparatus according to a third embodiment.
Figure 9:
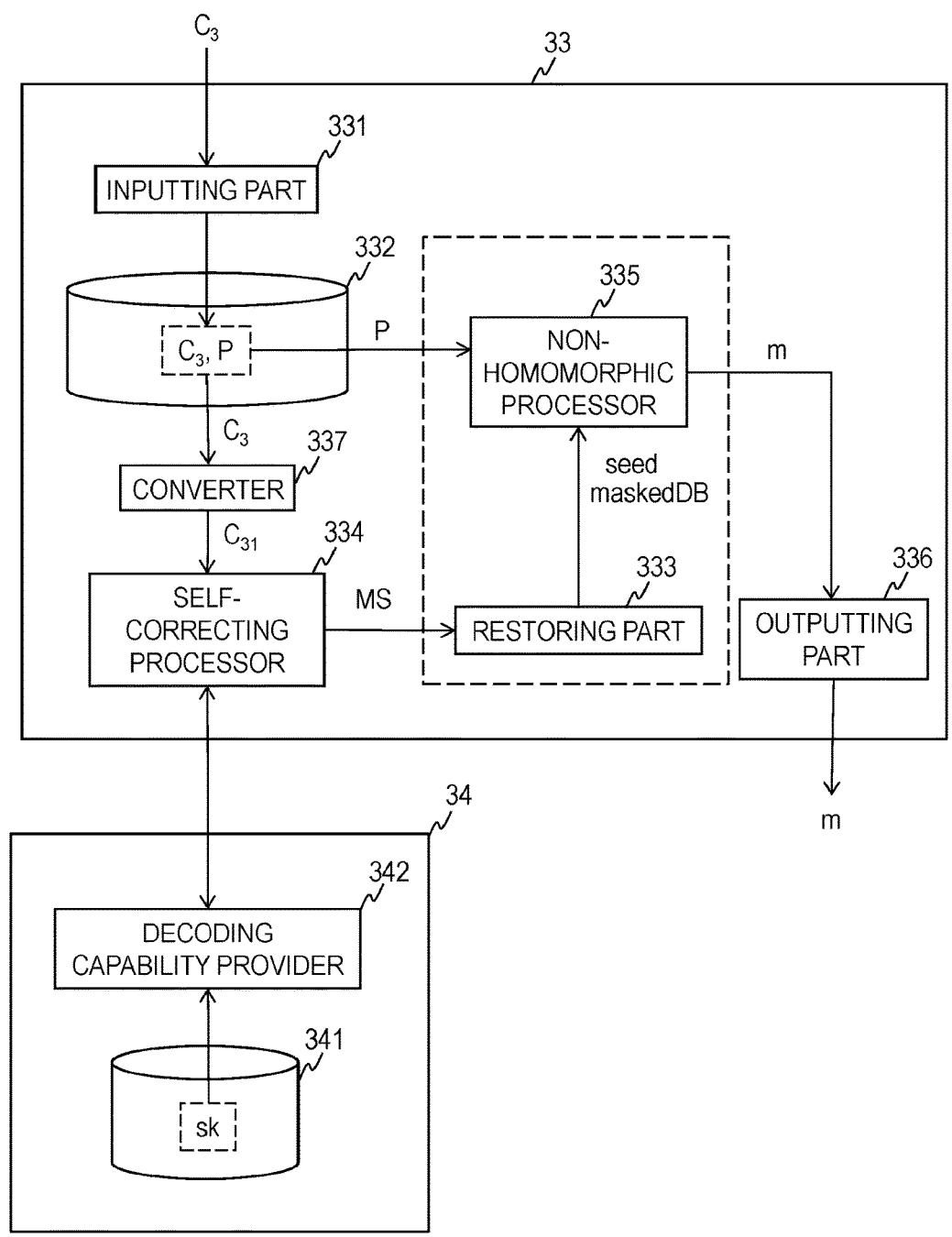
FIG. 9 is a block diagram of a decoding apparatus and a decoding capability providing apparatus according to the third embodiment.

As illustrated in FIG. 8, the encryption apparatus 32 of the present embodiment comprises a storage 321, a random value generator 322, a homomorphic encryptor 324, a non-homomorphic processor 325, a converter 326 and an outputting part 328. As illustrated in FIG. 9, the decoding apparatus 33 of the present embodiment comprises an inputting part 331, a storage 332, a restoring part 333, a self-correcting processor 334, a non-homomorphic processor 335, an outputting part 236 and a converter 337. As illustrated in FIG. 9, the decoding capability providing apparatus 34 of the present embodiment comprises a storage 341 and a decoding capability provider 342. Each of the key generation apparatus 31, the encryption apparatus 32, the decoding apparatus 33 and the decoding capability providing apparatus 34 is, for example, an apparatus configured by a predetermined program being loaded to the above-mentioned computer. Information outputted from each processing part is stored in a temporary memory which is not illustrated, read out as necessary and used for processing at each processing part.

<Processing>

The key generation apparatus 31 executes key generation algorithm $KeyGen(1^\lambda)$ to obtain a public key pk and a secret key sk. The public key pk is stored in the storage 321 of the encryption apparatus 32 (FIG. 8). Further, the public key pk is also set for other apparatuses. The secret key sk is safely stored in the storage 341 of the decoding capability providing apparatus 34 (FIG. 9). In the example of Reference literature 5, the public key pk is a RSA public key (e, n), and the secret key sk is a RSA secret key (n, d) corresponding to the RSA public key (e, n). Further, the key generation apparatus 31 outputs an encoding parameter P. The encoding parameter P is stored in the storage 321 of the encryption apparatus 32 and the storage 341 of the decoding capability providing apparatus 34.

Figure 10:
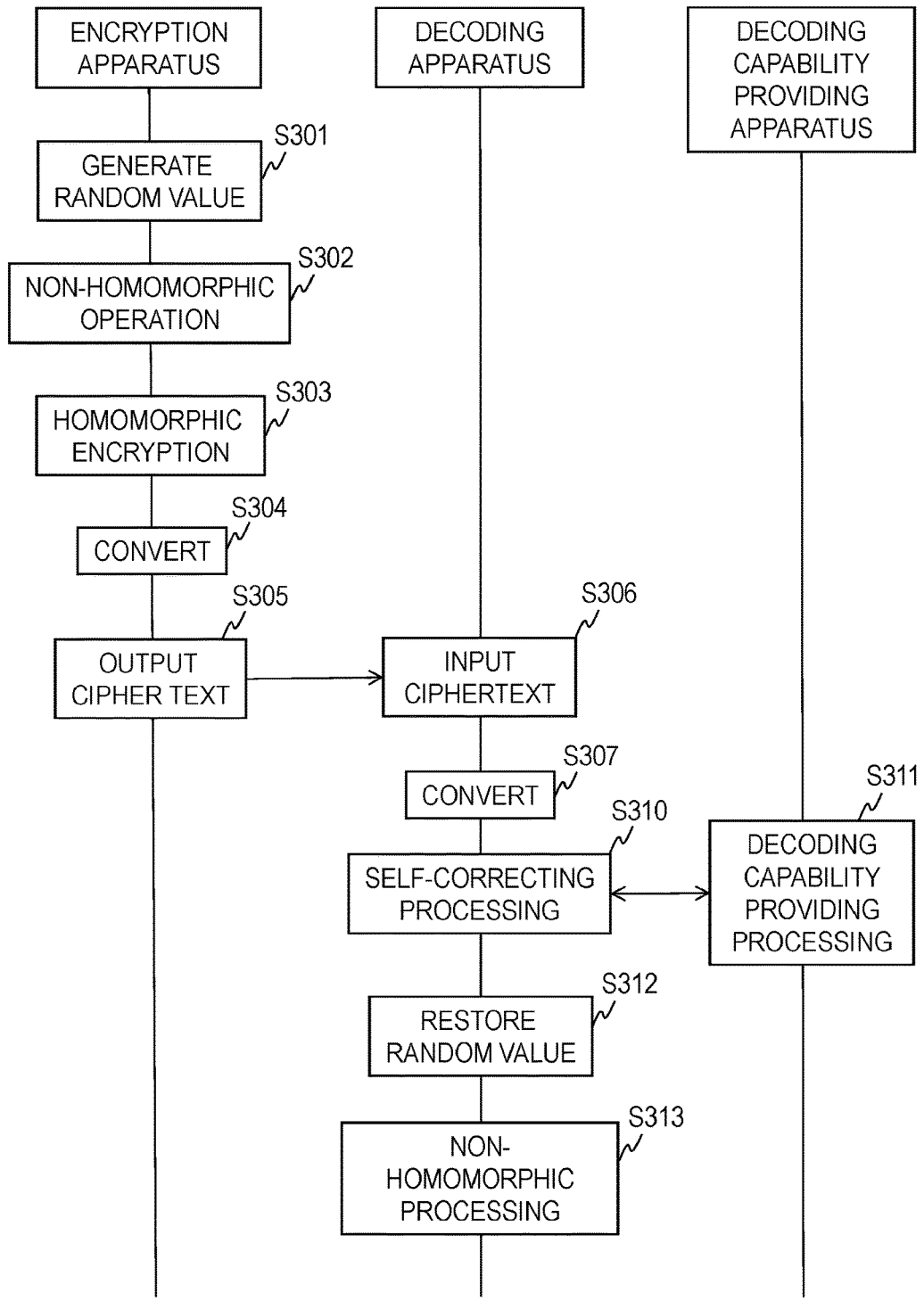
FIG. 10 is a diagram for explaining decoding processing according to the third embodiment.

Subsequently, as illustrated in FIG. 10, the random value generator 322 and the non-homomorphic processor 325 of the encryption apparatus 32 receive the plaintext m and the encoding parameter P read out from the storage 321 as input, performs non-homomorphic operation Encode (m, P)→MS to obtain MS. That is, the random value generator 322 generates a random value seed (step S301), and the non-homomorphic processor 325 performs non-homomorphic operation corresponding to the plaintext m, the random value seed and the encoding parameter P to obtain MS=Encode (m, P). For example, the non-homomorphic processor 325 obtains MS as follows:

pHash=Hash(P)
DB=pHash|PS|01|nm
dbMask=MGF(seed)
maskedDB=DB(+)dbMask
seedMask=MGF(maskedDB)
maskedSeed=seed(+)seedMask
EM=maskedSeed|maskedDB
MS=OS2IP(EM)

where Hash indicates a hash function of P, PS is zero bit sequences, MGF is a mask generation function, A(+)B indicates exclusive OR of A and B, and OS2IP is a conversion function (step S302).

The homomorphic encryptor 324 receives MS (value deriving from the plaintext m and information comprising the random value seed) and the public key pk read out from the storage 321 as input, encrypts MS by Enc(pk, MS)→$C_{31}$ to obtain and output the first ciphertext $C_{31}$ (step S303). The first ciphertext $C_{31}$ is ciphertext which can be decoded by homomorphic operation.

The converter 326 receives the first ciphertext $C_{31}$ as input, inputs the first ciphertext $C_{31}$ to the conversion function ISOSP to obtain and output ciphertext $C_3$=I2OSP (C31) (step S305). The ciphertext $C_3$ is transmitted to the decoding apparatus 33 through a network.

The ciphertext $C_3$ is inputted to the inputting part 331 of the decoding apparatus 33 (FIG. 3) and stored in the storage 332 (step S306). The converter 337 reads out the ciphertext $C_3$ from the storage 332, inputs the ciphertext $C_3$ to an inverse conversion function OS2IP of I2OSP to obtain and output the first ciphertext $C_{31}$=OS2IP($C_3$) (step S307).

The self-correcting processor 334 receives the first ciphertext $C_{31}$ as input, performs self-correcting processing (decoding processing using a cloud-managed key according to a self-correcting technique) with the decoding capability provider 342 of the decoding capability providing apparatus 34 which holds a secret key (decoding key) sk for decoding the first ciphertext $C_{31}$, and obtains and outputs a decoding value MS=Dec(sk, $C_{31}$) of the first ciphertext $C_{31}$ (step S310, S311).

That is, the self-correcting processor 334 provides information corresponding to the first ciphertext $C_{31}$ to the decoding capability provider 342 of the decoding capability providing apparatus 34 and obtains information to be used by the self-correcting processor 334 to obtain the decoding value MS of the first ciphertext $C_{31}$ from the decoding capability providing apparatus 34 without obtaining information of the secret key (decoding key) sk from the decoding capability providing apparatus 34. In other words, the decoding capability provider 342 of the decoding capability providing apparatus 34 obtains the information corresponding to the first ciphertext $C_{31}$ from the self-correcting processor 334, and outputs information to be used by the self-correcting processor 334 to obtain the decoding value MS of the first ciphertext $C_{31}$ by self-correcting processing to the self-correcting processor 334 without providing the information of the secret key sk to the decoding apparatus 33. The self-correcting processor 334 obtains the decoding value MS using the information provided from the decoding capability provider 342. Here, in order to avoid the decoding value MS from leaking to the decoding capability providing apparatus 34, it is desirable that the "information corresponding to the first ciphertext $C_{31}$" to be provided to the decoding capability provider 342 is information in which the ciphertext $C_{31}$ is disturbed. Specific examples of step S310, S311 are the above-mentioned "specific examples of decoding processing using a cloud-managed key according to a self-correcting technique" which is performed by setting x=$C_{31}$ and substituting the self-correcting processor 334 for the self-correcting processor 134 and substituting the decoding capability provider 342 for the decoding capability provider 142.

The restoring part 333 and the non-homomorphic processor 335 receive the decoding value MS and the encoding parameter P read out from the storage 332 as input, restore the plaintext m by non-homomorphic operation Decode(MS, P)→m and output the plaintext m. That is, the restoring part 333 restores a value maskedDB corresponding to the plaintext m and the random value seed from MS (step S312), the non-homomorphic processor 335 restores the plaintext from these and outputs the plaintext m, and the outputting part 336 outputs the plaintext m (step S313). These processing is non-homomorphic operation. For example, the restoring part 333 obtains EM=ISOSP(MS) using an inverse conversion function ISOSP of OS2IP, separates EM into maskedSeed and maskedDB which satisfy EM=maskedSeed|maskedDB, obtains seedMask=MGF (maskedDB) and obtains seed=maskedSeed(+)seedMask (step S312). The non-homomorphic processor 335 obtains dbMask=MGF(seed) using the obtained maskedDB and seed, obtains DB=maskedDB(+)dbMask, obtains pHash=Hash(P), obtains plaintext m which satisfies DB=pHash|PS|01|m, and the outputting part 336 outputs the plaintext m (step S313).

[Other Modifications, or the Like]

It should be noted that the present invention is not limited to the above-described embodiments. For example, instead of respective apparatuses exchanging information with each other through a network, it is also possible to make apparatuses in at least part of sets exchange information through a portable recording medium. Alternatively, it is also possible to make apparatuses in at least part of sets exchange information through a non-portable recording medium. That is, combinations of part of these apparatuses may be located in the same apparatus.

Further, the self-correcting technique is not limited to the above-mentioned technique. For example, a group H may be a direct product group G×G of a group G; the group G may be a cyclic group; a generator of the cyclic group G may be $\mu_g$; the first ciphertext $x=(c_1, c_2)$; (V, W) may be an origin of the group H; $f(V,W)=Y$; r4 to r7 may be natural random numbers of 0 or greater; $\tau_1=(c_2^b W^{r4}, c_1^b V^{r4} \mu_g^{r5})$; $\tau 2=(c_2^a W^{r6}, c_1^a V^{r6} \mu_g^{r7})$; $u=z_1 T^{-r4} \mu_g^{-r5}$; and $v=z_2 Y^{-r6} \mu_g^{-r7}$.

In the third embodiment, the encoding parameter P may be empty. In this case, the encoding parameter P is not generated and processing is performed assuming that P is empty. Further, in each embodiment, a bit sequence may be an octet sequence.

The order of execution of the above-described various processing is not limited to chronological order according to the description, but the processing may be executed in parallel or individually according to processing performance of an apparatus which executes processing or as necessary. In addition, of course, the above-described processing can be changed as appropriate without departing from the scope of the present invention.

When the above-described configuration is implemented with a computer, processing content of a function of each apparatus is described in a program. The above-described processing function is realized on the computer by this program being executed by the computer. The program which describes the processing content can be recorded in a computer readable recording medium. Examples of the computer readable recording medium comprise a non-transitory recording medium. Examples of such a recording medium comprise, a magnetic recording apparatus, an optical disk, a magnetooptical medium, a semiconductor memory, or the like.

This program is distributed by, for example, a portable recording medium such as a DVD and a CD-ROM in which the program is recorded being sold, transferred, lent, or the like. Further, it is also possible to distribute this program by storing this program in a storage apparatus of a server computer and transferring the program from the server computer to other computers through a network.

The computer which executes this program, for example, first, once stores the program recorded in the portable recording medium or the program transferred from the server computer in a storage apparatus of the computer. Upon execution of processing, the computer reads out the program stored in the storage apparatus of the computer and executes processing according to the read program. As another aspect of execution of this program, the computer may directly read out the program from the portable recording medium and execute processing according to the program, and further, may sequentially execute processing according to the processing every time a program is transferred from the server computer to this computer.

While a predetermined program is executed on a computer to implement processing functions of the present apparatus in the above-described embodiments, it is also possible to implement at least part of these processing functions with hardware.

DESCRIPTION OF REFERENCE NUMERALS 1, 2, 3 Security system
11, 21, 31 Key generation apparatus
12, 22, 32 Encryption apparatus
13, 23, 33 Decoding apparatus
14, 24, 34 Decoding capability providing apparatus

What is claimed is:

1. A decoding apparatus comprising:
a self-correcting processing circuitry configured to perform self-correcting processing with a decoding capability providing apparatus holding a decoding key for decoding first ciphertext by homomorphic operation to obtain a decoding value of the first ciphertext, the decoding capability providing apparatus being external and connected to the decoding apparatus via a network; and
a non-homomorphic processing circuitry configured to perform non-homomorphic operation using a value corresponding to or deriving from the decoding value of the first ciphertext and an addition value to output plaintext, wherein
the first ciphertext comprises a value obtained by encrypting a value corresponding to or deriving from a random value,
the self-correcting processing circuitry provides information of the first ciphertext to the decoding capability providing apparatus without randomizing the information and obtains information for obtaining the decoding value of the first ciphertext from the decoding capability providing apparatus at the self-correcting processing, and
the plaintext cannot be obtained only from the decoding value of the first ciphertext within polynomial time such that the decoding capability providing apparatus cannot obtain the plaintext based on the un-randomized information of the first ciphertext provided from the self-correcting processing circuitry.

2. A decoding apparatus comprising:
a self-correcting processing circuitry configured to perform self-correcting processing with a decoding capability providing apparatus holding a decoding key for decoding first ciphertext by homomorphic operation to obtain a decoding value of the first ciphertext, the decoding capability providing apparatus being external and connected to the decoding apparatus via a network; and a non-homomorphic processing circuitry configured to perform non-homomorphic operation using a value corresponding to or deriving from the decoding value of the first ciphertext and an addition value to output plaintext, wherein the addition value seed is a random value, DB includes the plaintext m, MGF is a mask generation function, OS2IP is a conversion function, A(+)B indicates exclusive OR of A and B, and A|B indicates a value concatenating information indicating A and information indicating B;

dbMask=MGF(seed);
maskedDB=DB(+)dbMask;
seedMask=MGF(maskedDB);
maskedSeed=seed(+)seedMask;
EM=maskedSeed|maskedDB;
MS=OS2IP(EM);

the first ciphertext is obtained by encrypting MS, the decoding value of the first ciphertext is MS, and ISOSP is an inverse conversion function of OS2IP; and the non-homomorphic processing circuitry obtains EM=ISOSP(MS), separates EM into maskedSeed and maskedDB which satisfy EM=maskedSeed|maskedDB, obtains seedMask=MGF(maskedDB), obtains seed=maskedSeed(+)seedMask, obtains dbMask=MGF(seed), obtains DB=maskedDB(+)dbMask, and obtains plaintext m from DB.

3. The decoding apparatus according to claim 1 or 2, wherein the plaintext is a decoding value of second ciphertext corresponding to or deriving from information comprising the first ciphertext, the first ciphertext is one-wayness under chosen-plaintext attack (OW-CPA) secure for the decoding value of the first ciphertext, and the second ciphertext is indistinguishability under chosen-ciphertext attack (IND-CCA) secure for the plaintext.

4. A decoding capability providing apparatus comprising:

a storage configured to hold a decoding key for decoding first ciphertext by homomorphic operation; and processing circuitry configured to obtain information corresponding to or deriving from the first ciphertext from a decoding apparatus which performs non-homomorphic operation using a value corresponding to or deriving from a decoding value of the first ciphertext and an addition value to output plaintext, and output information to be used by the decoding apparatus to obtain the decoding value of the first ciphertext by self-correcting processing to the decoding apparatus using the decoding key without providing information of the decoding key to the decoding apparatus, the decoding capability providing apparatus being external and connected to the decoding apparatus via a network, wherein the processing circuitry receives the information of the first ciphertext at the self-correcting processing, the information being sent from the decoding apparatus without being randomized;

the first ciphertext comprises a value obtained by encrypting a value corresponding to or deriving from a random value; and the plaintext cannot be obtained only from the decoding value of the first ciphertext within polynomial time such that the decoding capability providing apparatus cannot obtain the plaintext based on the un-randomized information of the first ciphertext provided from the decoding apparatus.

5. The decoding capability providing apparatus according to claim 4, wherein the plaintext is a decoding value of second ciphertext corresponding to or deriving from information comprising the first ciphertext, the first ciphertext is one-wayness under chosen-plaintext attack (OW-CPA) secure for the decoding value of the first ciphertext, and the second ciphertext is indistinguishability under chosen-ciphertext attack (IND-CCA) secure for the plaintext.

6. A decoding method, implemented by a decoding apparatus, comprising:

a step of performing self-correcting processing with a decoding capability providing apparatus holding a decoding key for decoding first ciphertext by homomorphic operation to obtain a decoding value of the first ciphertext at a self-correcting processing circuitry, the decoding capability providing apparatus being external and connected to the decoding apparatus via a network; and a step of performing non-homomorphic operation using a value corresponding to or deriving from the decoding value of the first ciphertext and an addition value to output plaintext at a non-homomorphic processing circuitry, wherein the first ciphertext comprises a value obtained by encrypting a value corresponding to or deriving from a random value, the step of performing self-correcting processing including steps of providing information of the first ciphertext to the decoding capability providing apparatus without disturbing the information, and obtaining information for obtaining the decoding value of the first ciphertext from the decoding capability providing apparatus, and the plaintext cannot be obtained only from the decoding value of the first ciphertext within polynomial time such that the decoding capability providing apparatus cannot obtain the plaintext based on the un-randomized information of the first ciphertext provided from the self-correcting processing circuitry.

7. A decoding capability providing method, implemented by a decoding capability providing apparatus, comprising:

a step, by processing circuitry, of obtaining information corresponding to first ciphertext from a decoding apparatus which performs non-homomorphic operation using a value corresponding to or deriving from a decoding value of the first ciphertext which is decoded by homomorphic operation and an addition value to output plaintext, the decoding capability providing apparatus being external and connected to the decoding apparatus via a network; and a step, by the processing circuitry, of outputting information to be used by the decoding apparatus to obtain the decoding value of the first ciphertext by self-correcting processing to the decoding apparatus using a decoding key for decoding the first ciphertext without providing information of the decoding key to the decoding apparatus, wherein the processing circuitry receives the information of the first ciphertext, the information being sent from the decoding apparatus without being randomized;

the first ciphertext comprises a value obtained by encrypting a value corresponding to or deriving from a random value; and the plaintext cannot be obtained only from the decoding value of the first ciphertext within polynomial time such that the decoding capability providing apparatus cannot obtain the plaintext based on the un-randomized information of the first ciphertext provided from the decoding apparatus.

8. A decoding method comprising:
a step of performing self-correcting processing with a decoding capability providing apparatus holding a decoding key for decoding first ciphertext by homomorphic operation to obtain a decoding value of the first ciphertext at a self-correcting processing circuitry, the decoding capability providing apparatus being external and connected to the decoding apparatus via a network; and
a step of performing non-homomorphic operation using a value corresponding to or deriving from the decoding value of the first ciphertext and an addition value seed to output plaintext m at a non-homomorphic processing circuitry, wherein
the addition value seed is a random value, DB includes the plaintext m, MGF is a mask generation function, OS2IP is a conversion function, A(+)B indicates exclusive OR of A and B, and A|B indicates a value concatenating information indicating A and information indicating B;
dbMask=MGF(seed);
maskedDB=DB(+)dbMask;
seedMask=MGF(maskedDB),
maskedSeed=seed(+)seedMask;
EM=maskedSeed|maskedDB;
MS=OS2IP(EM);
the first ciphertext is obtained by encrypting MS, the decoding value of the first ciphertext is MS, and ISOSP is an inverse conversion function of OS2IP; and
the non-homomorphic processing circuitry obtains EM=ISOSP(MS), separates EM into maskedSeed and maskedDB which satisfy EM=maskedSeed|maskedDB, obtains seedMask=MGF(maskedDB), obtains seed=maskedSeed(+)seedMask, obtains dbMask=MGF(seed), obtains DB=maskedDB(+)dbMask, and obtains plaintext m from DB.

9. A non-transitory computer-readable recording medium having stored thereon a program for causing a computer to function as a decoding apparatus comprising:
a self-correcting processing circuitry configured to perform self-correcting processing with a decoding capability providing apparatus holding a decoding key for decoding first ciphertext which is decoded by homomorphic operation to obtain a decoding value of the first ciphertext, the decoding capability providing apparatus being external and connected to the decoding apparatus via a network; and
a non-homomorphic processing circuitry configured to perform non-homomorphic operation using a value corresponding to or deriving from the decoding value of the first ciphertext and an addition value to output plaintext, wherein
the first ciphertext comprises a value obtained by encrypting a value corresponding to or deriving from a random value,
the step of performing self-correcting processing including steps of providing information of the first ciphertext to the decoding capability providing apparatus without disturbing the information, and obtaining information for obtaining the decoding value of the first ciphertext from the decoding capability providing apparatus, and the plaintext cannot be obtained only from the decoding value of the first ciphertext within polynomial time such that the decoding capability providing apparatus cannot obtain the plaintext based on the un-randomized information of the first ciphertext provided from the self-correcting processing circuitry.

10. A non-transitory computer-readable recording medium having stored thereon a program for causing a computer to function as a decoding apparatus comprising:
a self-correcting processing circuitry configured to perform self-correcting processing with a decoding capability providing apparatus holding a decoding key for decoding first ciphertext which is decoded by homomorphic operation to obtain a decoding value of the first ciphertext, the decoding capability providing apparatus being external and connected to the decoding apparatus via a network; and
a non-homomorphic processing circuitry configured to perform non-homomorphic operation using a value corresponding to or deriving from the decoding value of the first ciphertext and an addition value to output plaintext, wherein
the addition value seed is a random value, DB includes the plaintext m, MGF is a mask generation function, OS2IP is a conversion function, A(+)B indicates exclusive OR of A and B, and A|B indicates a value concatenating information indicating A and information indicating B;
dbMask=MGF(seed);
masked DB=DB(+)dbMask;
seedMask=MGF(masked DB),
maskedSeed=seed(+)seedMask;
EM=maskedSeed|maskedDB;
MS=OS2IP(EM);
the first ciphertext is obtained by encrypting MS, the decoding value of the first ciphertext is MS, and ISOSP is an inverse conversion function of OS2IP; and
the non-homomorphic processing circuitry obtains EM=ISOSP(MS), separates EM into maskedSeed and maskedDB which satisfy EM=maskedSeed|maskedDB, obtains seedMask=MGF(masked DB), obtains seed=maskedSeed(+)seedMask, obtains dbMask=MGF(seed), obtains DB=masked DB(+)dbMask, and obtains plaintext m from DB.

11. A non-transitory computer-readable recording medium having stored thereon a program for causing a computer to function as a decoding capability providing apparatus comprising:
a storage configured to hold a decoding key for decoding first ciphertext by homomorphic operation; and
processing circuitry configured to
obtain information corresponding to or deriving from the first ciphertext from a decoding apparatus which performs non-homomorphic operation using a value corresponding to or deriving from a decoding value of the first ciphertext and an addition value to output plaintext, and output information to be used by the decoding apparatus to obtain the decoding value of the first ciphertext by self-correcting processing to the decoding apparatus using the decoding key without providing information of the decoding key to the decoding apparatus, the decoding capability providing apparatus being external and connected to the decoding apparatus via a network, wherein the processing circuitry receives the information of the first ciphertext at the self-correcting processing, the information being sent from the decoding apparatus without being randomized;

the first ciphertext comprises a value obtained by encrypting a value corresponding to or deriving from a random value; and the plaintext cannot be obtained only from the decoding value of the first ciphertext within polynomial time such that the decoding capability providing apparatus cannot obtain the plaintext based on the un-randomized information of the first ciphertext provided from the decoding apparatus.

* * * * *